US012613478B2

(12) United States Patent
Matsuo et al.

(10) Patent No.: US 12,613,478 B2
(45) Date of Patent: Apr. 28, 2026

(54) TONER, TONER PRODUCTION METHOD, AND TWO-COMPONENT DEVELOPER

(71) Applicant: CANON KABUSHIKI KAISHA, Tokyo (JP)

(72) Inventors: Ryuichiro Matsuo, Ibaraki (JP); Toru Takahashi, Ibaraki (JP); Daisuke Tsujimoto, Tokyo (JP); Shin Kitamura, Ibaraki (JP); Ryuji Murayama, Chiba (JP); Hitoshi Sano, Chiba (JP); Nobuyuki Fujita, Tokyo (JP); Shuji Yamada, Chiba (JP); Yuka Gunji, Ibaraki (JP); Takakuni Kobori, Ibaraki (JP); Yoshihiro Ogawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 428 days.

(21) Appl. No.: 18/307,826

(22) Filed: Apr. 27, 2023

(65) Prior Publication Data

US 2023/0408940 A1 Dec. 21, 2023

(30) Foreign Application Priority Data

Apr. 28, 2022 (JP) ................................ 2022-074957

(51) Int. Cl.
*G03G 9/093* (2006.01)
*G03G 9/107* (2006.01)

(52) U.S. Cl.
CPC ..... *G03G 9/09342* (2013.01); *G03G 9/09328* (2013.01); *G03G 9/1075* (2013.01)

(58) Field of Classification Search
CPC ........... G03G 9/09342; G03G 9/09328; G03G 9/1075
See application file for complete search history.

(56) References Cited

U.S. PATENT DOCUMENTS 5,641,601 A 6/1997 Mitani et al.
5,686,054 A 11/1997 Barthel et al.
5,981,131 A * 11/1999 Hirama .................... C09C 3/12 430/108.7
6,287,739 B1 * 9/2001 Kawakami ........... G03G 9/0819 430/108.7
7,001,703 B2 2/2006 Moribe et al.
7,097,951 B2 8/2006 Moribe
7,123,862 B2 10/2006 Hasegawa
7,147,981 B2 12/2006 Fujikawa
7,267,919 B2 9/2007 Moribe
7,279,262 B2 10/2007 Fujikawa
7,368,211 B2 5/2008 Hasegawa
7,402,368 B2 7/2008 Ogawa
7,422,832 B2 9/2008 Ogawa
7,470,494 B2 12/2008 Nishiyama
7,582,401 B2 9/2009 Ogawa
7,678,523 B2 3/2010 Hiroko
7,678,524 B2 3/2010 Hasegawa
7,704,659 B2 4/2010 Ogawa
7,811,734 B2 10/2010 Ogawa
7,855,042 B2 12/2010 Kobori
7,923,190 B2 4/2011 Magome
7,935,467 B2 5/2011 Dojo
7,939,231 B2 5/2011 Ogawa
8,084,174 B2 12/2011 Hasegawa
8,124,306 B2 2/2012 Hirata
8,227,162 B2 7/2012 Sano
8,426,091 B2 4/2013 Magome
8,426,094 B2 4/2013 Magome
8,501,377 B2 8/2013 Takahashi
8,512,925 B2 8/2013 Moribe
8,518,620 B2 8/2013 Dojo
8,614,044 B2 12/2013 Matsui
8,778,585 B2 7/2014 Matsui
8,841,054 B2 9/2014 Dojo
9,046,800 B2 6/2015 Hotta
9,097,998 B2 8/2015 Yamazaki
9,128,400 B2 9/2015 Takahashi
9,152,065 B2 10/2015 Sano
9,152,088 B1 10/2015 Kobori
9,158,217 B2 10/2015 Takahashi
(Continued)

FOREIGN PATENT DOCUMENTS

EP 2 799 929 A1 11/2014
EP 2 853 945 A1 4/2015
(Continued)

OTHER PUBLICATIONS

English machine translation of the description of JP-2016167029-A (Year: 2016).*
U.S. Appl. No. 18/173,255, filed Feb. 23, 2023, Takayuki Toyoda.
U.S. Appl. No. 18/307,825, filed Apr. 27, 2023, Hiroki Kagawa.
U.S. Appl. No. 18/307,827, filed Apr. 27, 2023, Shin Kitamura.
U.S. Appl. No. 18/307,828, filed Apr. 27, 2023, Daisuke Tsujimoto.
U.S. Appl. No. 18/307,829, filed Apr. 27, 2023, Kazuyuki Sato.
U.S. Appl. No. 18/307,832, filed Apr. 27, 2023, Shohei Shibahara.
Echa Reach Registration Dossier, https://echa.europa.eu/registration-dossier/-/registered-dossier/15289/4/13.

*Primary Examiner* — Mark F. Huff
*Assistant Examiner* — Boone Alexander Evans
(74) *Attorney, Agent, or Firm* — VENABLE LLP

(57) ABSTRACT

A toner comprising a toner particle and a silica fine particle A on a surface of the toner particle, wherein: a weight-average particle diameter of the toner is 4.0 to 15.0 μm; the silica fine particle A comprises a silicone oil and a carbon loss ratio when the silica fine particle A is washed with hexane is 5 to 70%; and an area of each peak obtained in a solid-state CP/MAS $^{29}$Si-NMR measurement of the silica fine particle A and of the silica fine particle A after washing thereof with hexane is in a specific range.

13 Claims, No Drawings

(56) References Cited

U.S. PATENT DOCUMENTS

| | | | |
|---|---|---|---|
| 9,229,345 B2 | 1/2016 | Ikeda | |
| 9,235,151 B2 | 1/2016 | Tanaka | |
| 9,348,253 B2 | 5/2016 | Kanno | |
| 9,372,420 B2 | 6/2016 | Mizo | |
| 9,377,708 B2 | 6/2016 | Magome | |
| 9,417,540 B2 | 8/2016 | Hashimoto | |
| 9,423,708 B2 | 8/2016 | Tominaga et al. | |
| 9,436,112 B2 | 9/2016 | Iwasaki | |
| 9,454,094 B2 | 9/2016 | Tsujimoto | |
| 9,551,947 B2 | 1/2017 | Hiroko | |
| 9,606,466 B2 | 3/2017 | Takahashi | |
| 9,651,883 B2 | 5/2017 | Hama | |
| 9,665,021 B2 | 5/2017 | Ohtsu | |
| 9,665,023 B2 | 5/2017 | Kamae | |
| 9,665,026 B2 | 5/2017 | Iwasaki | |
| 9,671,707 B2 | 6/2017 | Minagawa | |
| 9,703,216 B2 | 7/2017 | Tsuchida | |
| 9,785,068 B2 | 10/2017 | Umeda | |
| 9,804,514 B2 | 10/2017 | Suzumura | |
| 9,804,519 B2 | 10/2017 | Suzumura | |
| 9,829,816 B2 | 11/2017 | Tanaka | |
| 9,841,692 B2 | 12/2017 | Hasegawa | |
| 9,880,478 B2 | 1/2018 | Shimano | |
| 9,897,934 B2 | 2/2018 | Tamura | |
| 9,915,885 B2 | 3/2018 | Katsumata | |
| 9,927,728 B2 | 3/2018 | Arimura | |
| 9,946,179 B2 | 4/2018 | Arimura | |
| 9,946,181 B2 | 4/2018 | Hasegawa | |
| 9,964,874 B2 | 5/2018 | Suzumura | |
| 9,964,881 B2 | 5/2018 | Ikejiri | |
| 9,969,834 B2 | 5/2018 | Ohtsu | |
| 9,971,262 B2 | 5/2018 | Hasegawa | |
| 9,971,264 B2 | 5/2018 | Sano | |
| 10,012,918 B2 | 7/2018 | Ishigami | |
| 10,012,920 B2 | 7/2018 | Shibata | |
| 10,012,921 B2 | 7/2018 | Kamae | |
| 10,012,923 B2 | 7/2018 | Sano | |
| 10,036,970 B2 | 7/2018 | Kanno | |
| 10,078,281 B2 | 9/2018 | Ida | |
| 10,082,743 B2 | 9/2018 | Hama | |
| 10,088,765 B2 | 10/2018 | Miyakai | |
| 10,114,303 B2 | 10/2018 | Katsura | |
| 10,133,201 B2 | 11/2018 | Kamae | |
| 10,146,146 B2 | 12/2018 | Komatsu | |
| 10,151,990 B2 | 12/2018 | Suzuki | |
| 10,175,595 B2 | 1/2019 | Onozaki | |
| 10,197,936 B2 | 2/2019 | Onozaki | |
| 10,203,619 B2 | 2/2019 | Yamashita | |
| 10,216,108 B2 | 2/2019 | Iwasaki | |
| 10,228,627 B2 | 3/2019 | Nagashima | |
| 10,228,629 B2 | 3/2019 | Tamura | |
| 10,234,777 B2 | 3/2019 | Ohtsu | |
| 10,295,920 B2 | 5/2019 | Nishikawa | |
| 10,303,075 B2 | 5/2019 | Tanaka | |
| 10,310,397 B2 | 6/2019 | Sano | |
| 10,353,312 B2 | 7/2019 | Kamae | |
| 10,401,748 B2 | 9/2019 | Hashimoto | |
| 10,423,090 B2 | 9/2019 | Ohtsu | |
| 10,451,985 B2 | 10/2019 | Takahashi | |
| 10,451,986 B2 | 10/2019 | Sano | |
| 10,451,990 B2 | 10/2019 | Kamae | |
| 10,474,049 B2 | 11/2019 | Onozaki | |
| 10,514,624 B2 | 12/2019 | Tamura | |
| 10,545,420 B2 | 1/2020 | Kinumatsu | |
| 10,551,759 B2 | 2/2020 | Watanabe | |
| 10,564,560 B2 | 2/2020 | Onozaki et al. | |
| 10,642,178 B2 | 5/2020 | Yamashita | |
| 10,698,327 B2 | 6/2020 | Nagashima | |
| 10,747,132 B2 | 8/2020 | Takahashi | |
| 10,768,543 B2 | 9/2020 | Tsujimoto | |
| 10,775,710 B1 | 9/2020 | Kamae | |
| 10,782,623 B2 | 9/2020 | Yoshiba et al. | |
| 10,838,317 B2 | 11/2020 | Sugahara | |
| 10,859,935 B2 | 12/2020 | Ohtsu | |
| 10,859,936 B2 | 12/2020 | Sugahara | |
| 10,877,386 B2 | 12/2020 | Murayama | |
| 10,877,391 B2 | 12/2020 | Matsuo | |
| 10,935,902 B2 | 3/2021 | Kanno | |
| 10,955,765 B2 | 3/2021 | Onozaki | |
| 10,969,704 B2 | 4/2021 | Kagawa | |
| 11,079,695 B2 | 8/2021 | Sato | |
| 11,099,493 B2 | 8/2021 | Komiya | |
| 11,112,709 B2 | 9/2021 | Saeki | |
| 11,112,713 B2 | 9/2021 | Akiyama | |
| 11,131,938 B2 | 9/2021 | Murayama | |
| 11,181,844 B2 | 11/2021 | Nagaoka | |
| 11,249,410 B2 | 2/2022 | Takahashi | |
| 11,415,902 B2 | 8/2022 | Watanabe | |
| 11,429,032 B2 | 8/2022 | Shibata | |
| 11,448,980 B2 | 9/2022 | Matsui | |
| 11,531,284 B2 | 12/2022 | Iguchi et al. | |
| 11,698,594 B2 | 7/2023 | Takahashi | |
| 2003/0031946 A1 | 2/2003 | Sugiura et al. | |
| 2006/0067867 A1 | 3/2006 | Ishibashi et al. | |
| 2010/0273103 A1* | 10/2010 | Baba | G03G 9/0827 430/110.4 |
| 2011/0311910 A1 | 12/2011 | Matsui et al. | |
| 2012/0107741 A1 | 5/2012 | Hiraoka et al. | |
| 2013/0296578 A1* | 11/2013 | Amano | G03G 9/09725 549/214 |
| 2014/0377696 A1 | 12/2014 | Hasegawa et al. | |
| 2015/0185644 A1 | 7/2015 | Matsui | |
| 2015/0378274 A1 | 12/2015 | Abe et al. | |
| 2018/0074421 A1 | 3/2018 | Uchino | |
| 2018/0246430 A1 | 8/2018 | Tanaka et al. | |
| 2019/0113858 A1 | 4/2019 | Kamae et al. | |
| 2019/0137902 A1 | 5/2019 | Shibata | |
| 2021/0055668 A1 | 2/2021 | Tamura | |
| 2021/0255557 A1 | 8/2021 | Watanabe | |
| 2021/0286282 A1 | 9/2021 | Kobori | |
| 2021/0302853 A1 | 9/2021 | Murata | |
| 2021/0302854 A1 | 9/2021 | Kitamura | |
| 2021/0302855 A1 | 9/2021 | Torii | |
| 2021/0302856 A1 | 9/2021 | Nagashima | |
| 2021/0397106 A1 | 12/2021 | Kobori | |
| 2022/0026822 A1 | 1/2022 | Sato | |
| 2022/0026823 A1 | 1/2022 | Sano | |
| 2022/0050398 A1 | 2/2022 | Ooyama | |
| 2022/0128916 A1 | 4/2022 | Yoshida | |
| 2022/0171302 A1 | 6/2022 | Sato | |
| 2022/0171303 A1 | 6/2022 | Hiramatsu | |
| 2022/0252995 A1 | 8/2022 | Tsujimoto | |
| 2022/0326633 A1 | 10/2022 | Aoki | |
| 2022/0373906 A1 | 11/2022 | Ohmori | |
| 2022/0373911 A1 | 11/2022 | Kamae | |
| 2022/0373919 A1 | 11/2022 | Imura | |
| 2023/0014130 A1 | 1/2023 | Sano | |
| 2023/0122974 A1 | 4/2023 | Kagawa | |
| 2023/0152725 A1 | 5/2023 | Ochi | |

FOREIGN PATENT DOCUMENTS

| | | | | |
|---|---|---|---|---|
| JP | 7-330324 | A | | 12/1995 |
| JP | 9-204065 | A | | 8/1997 |
| JP | 11-174727 | A | | 7/1999 |
| JP | 2000-147831 | A | | 5/2000 |
| JP | 2002-23413 | A | | 1/2002 |
| JP | 2002-139862 | A | | 5/2002 |
| JP | 2002-182423 | A | | 6/2002 |
| JP | 2002-256173 | A | | 9/2002 |
| JP | 2004-126249 | A | | 4/2004 |
| JP | 2004-126251 | A | | 4/2004 |
| JP | 2007-114630 | A | | 5/2007 |
| JP | 2007-176747 | A | | 7/2007 |
| JP | 2008-145490 | A | | 6/2008 |
| JP | 2009-31426 | A | | 2/2009 |
| JP | 2009-271394 | A | | 11/2009 |
| JP | 2009-276643 | A | | 11/2009 |
| JP | 2012-236752 | A | | 12/2012 |
| JP | 2015-11070 | A | | 1/2015 |
| JP | 2016-66049 | A | | 4/2016 |
| JP | 2016167029 | A | * | 9/2016 |
| JP | 2019-3082 | A | | 1/2019 |
| JP | 2019-86705 | A | | 6/2019 |

(56) References Cited

FOREIGN PATENT DOCUMENTS

| | | | |
|---|---|---|---|
| JP | 2019-109416 | A | 7/2019 |
| JP | 2020-91471 | A | 6/2020 |
| JP | 2020-95081 | A | 6/2020 |
| JP | 2020-154294 | A | 9/2020 |
| JP | 2021-148999 | A | 9/2021 |
| WO | 2004060803 | A1 | 7/2004 |

* cited by examiner

TONER, TONER PRODUCTION METHOD, AND TWO-COMPONENT DEVELOPER

BACKGROUND OF THE INVENTION

Field of the Invention

The present disclosure relates to a toner and two-component developer for developing the electrostatic image that is used in, for example, electrophotographic methods and electrostatic recording methods, and also relates to a toner production method.

Description of the Related Art

Electrophotographic system-based full-color copiers have in recent years become widespread and are beginning to be applied to the print market. The print market requires that a wide range of media (paper types) be accommodated while also requiring high speeds, high image qualities, and high productivities achieved through extended continuous operation.

Stabilization of the toner charging characteristics is necessary in order to boost image quality. Various investigations of external additives have been carried out in pursuit of stabilization of toner charging characteristics. For example, Japanese Patent Application Laid-Open No. 2016-167029 discloses a toner having improved charging characteristics as achieved by the external addition of silica particles that have been surface-treated with cyclic siloxane. Japanese Patent Application Laid-Open No. 2009-031426 discloses a toner having cyclic siloxane at the surface.

In order to achieve additional enhancements in image quality, a toner is required that provides a high transfer efficiency, without image chipping and without hollow defects during transfer. For example, Japanese Patent Application Laid-Open No. H9-204065 discloses a toner that exhibits a high transfer efficiency, which is achieved by the external addition of an inorganic fine powder that has been subjected to a surface treatment with silicone oil.

Investigations have also been carried out, in order to achieve high productivities via extended continuous operation, into suppressing member contamination through the use of external additives. For example, Japanese Patent Application Laid-Open No. 2004-126251 discloses a toner provided by the external addition of a silica particle the surface of which has been subjected first to surface treatment by a silane coupling agent followed by surface treatment with a silicone oil.

SUMMARY OF THE INVENTION

However, in order to reach even higher levels with regard to higher speeds, higher image qualities, and higher productivities achieved through extended continuous operation, the toner charging performance must exhibit little environmental dependence and in addition must exhibit a high temporal stability. These properties are also referred to in the following using the term "charge retention"

On the other hand, it has been possible—through a release effect brought about by treatment with, e.g., silicone oil—to suppress hollow defects during transfer, image chipping, and member contamination caused by external additive attachment. However, for example, as speeds have undergone additional increases, higher discharge energies at the charging member have become necessary in order to obtain desired properties.

When a silica fine particle is present on the photosensitive member, it receives the high discharge energy. At this time, the silicone oil that has received excess energy can undergo volatilization and be released from the external additive and attach to the charging member and thereby contaminate the charging member. Such member contamination that occurs when the toner and the member are not in contact cannot be prevented by the conventional release effect provided by silicone oil. As a result, the image uniformity can be reduced due to charge non-uniformity at the photosensitive member, and additional improvements have thus been required.

The toners disclosed in the documents cited above have been inadequate with regard to simultaneously satisfying the following: improving the temporal stability and suppressing environmental dependence in relation to charge retention for the toner, while at the same time achieving suppression of hollow defects during transfer and suppression of member contamination.

The present disclosure provides a toner that, in relation to charge retention for the toner, can provide greater suppression of environmental dependence and an enhanced temporal stability, while at the same time being able to suppress hollow defects during transfer and being able to suppress the member contamination caused by external additives and siloxane structure-bearing compounds.

The present disclosure relates to a toner comprising a toner particle and a silica fine particle A on a surface of the toner particle, wherein:

a weight-average particle diameter of the toner is 4.0 to 15.0 μm;

the silica fine particle A comprises a silicone oil and a carbon loss ratio when the silica fine particle A is washed with hexane is 5 to 70%; and upon measuring, in a solid-state CP/MAS $^{29}$Si-NMR measurement of the silica fine particle A, a peak PD1 corresponding to a silicon atom indicated by $Si^a$ in a structure given by Formula (1) and a peak PD2 corresponding to a silicon atom indicated by $Si^b$ in a structure given by Formula (2), and letting SD1 be an area of the peak PD1 and SD2 be an area of the peak PD2, and upon measuring, in a solid-state CP/MAS $^{29}$Si-NMR measurement of the silica fine particle A after washing thereof with hexane, a peak PD1w corresponding to a silicon atom indicated by $Si^a$ in a structure given by Formula (1) and a peak PD2w corresponding to a silicon atom indicated by $Si^b$ in a structure given by Formula (2), and letting SD1w be an area of the peak PD1w and SD2w be an area of the peak PD2w, SD2/SD1 is 0.05 to 0.30 and SD2w/SD1w is 0.05 or more;

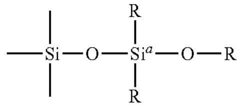

(1)

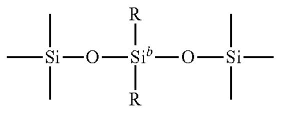

(2)

in formulas (1) and (2), each R is independently a hydrogen atom, methyl group, or ethyl group.

The present disclosure can thus provide a toner that, in relation to charge retention for the toner, can provide greater suppression of environmental dependence and an enhanced temporal stability, while at the same time being able to suppress hollow defects during transfer and being able to suppress the member contamination caused by external additives and siloxane structure-bearing compounds. Further features of the present invention will become apparent from the following description of exemplary embodiments.

DESCRIPTION OF THE EMBODIMENTS

Unless specifically indicated otherwise, in the present disclosure the expressions "from XX to YY" and "XX to YY" that show numerical value ranges refer to numerical value ranges that include the lower limit and upper limit that are the end points. When numerical value ranges are provided in stages, the upper limits and lower limits of the individual numerical value ranges may be combined in any combination. In addition, monomer unit refers to the reacted form of the monomer substance in the polymer.

The present inventors carried out intensive investigations directed to a toner that would provide greater suppression of environmental dependence and an enhanced temporal stability, while at the same time being able to suppress hollow defects during transfer and being able to suppress the member contamination caused by external additives and siloxane structure-bearing compounds. It was discovered as a result that this problem can be solved by the toner described in the following.

The present disclosure relates to a toner comprising a toner particle and a silica fine particle A on a surface of the toner particle, wherein:

a weight-average particle diameter of the toner is 4.0 to 15.0 μm;

the silica fine particle A comprises a silicone oil and a carbon loss ratio when the silica fine particle A is washed with hexane is 5 to 70%; and upon measuring, in a solid-state CP/MAS $^{29}$Si-NMR measurement of the silica fine particle A, a peak PD1 corresponding to a silicon atom indicated by $Si^a$ in a structure given by Formula (1) and a peak PD2 corresponding to a silicon atom indicated by $Si^b$ in a structure given by Formula (2), and letting SD1 be an area of the peak PD1 and SD2 be an area of the peak PD2, and upon measuring, in a solid-state CP/MAS $^{29}$Si-NMR measurement of the silica fine particle A after washing thereof with hexane, a peak PD1w corresponding to a silicon atom indicated by $Si^a$ in a structure given by Formula (1) and a peak PD2w corresponding to a silicon atom indicated by $Si^b$ in a structure given by Formula (2), and letting SD1w be an area of the peak PD1w and SD2w be an area of the peak PD2w, SD2/SD1 is 0.05 to 0.30 and SD2w/SD1w is 0.05 or more;

(1)

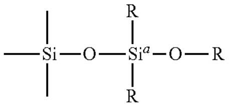

(2)

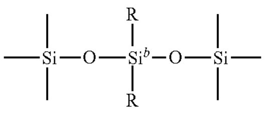

in formulas (1) and (2), each R is independently a hydrogen atom, methyl group, or ethyl group.

The reasons for the occurrence of the aforementioned effects are thought to be as follows.

Generally, in solid-state CP/MAS $^{29}$Si-NMR measurements, when the molecular mobility of a unit structure being measured is reduced to a certain degree, a peak corresponding to this unit structure is observed and the peak is larger as the molecular mobility declines. Due to this, it is thought that the silica fine particle A having, in solid-state CP/MAS $^{29}$Si-NMR measurement of the silica fine particle A, a peak PD1 corresponding to the silicon atom indicated by $Si^a$ in the structure given by Formula (1) and a peak PD2 corresponding to the silicon atom indicated by $Si^b$ in the structure given by Formula (2), indicates that the structure given by Formula (1) (D1 unit structure) and the structure given by Formula (2) (D2 unit structure) are reacted with and bound to the surface of the silica fine particle substrate, with or without an interposed siloxane structure. It is also thought that the D1 unit structure and the D2 unit structure are strongly physically bound to the surface of the silica fine particle substrate.

The "silicon atom indicated by $Si^a$ in the structure given by Formula (1)" is, put differently, a silicon atom having the D1 unit structure, and the "silicon atom indicated by $Si^b$ in the structure given by Formula (2)" is, put differently, a silicon atom having the D2 unit structure.

The magnitude of the molecular mobility of the unit structure being measured can be observed using solid-state CP/MAS $^{29}$Si-NMR measurement. That is, a large area for the peak corresponding to the unit structure being measured indicates a low molecular mobility for the unit structure being measured, while a small area for the peak corresponding to the unit structure being measured indicates a high molecular mobility for the unit structure being measured. When, in solid-state CP/MAS $^{29}$Si-NMR measurement of the silica fine particle A, the peak PD1 corresponding to the D1 unit structure and the peak PD2 corresponding to the D2 unit structure are present and the value of the ratio (SD2/SD1) between the areas of these peaks is in a certain range, this indicates that the molecular mobilities of both the D1 unit structure and the D2 unit structure are being controlled.

The D1 unit structure in silica fine particle A primarily derives from a molecular structure produced by reaction of the silica fine particle substrate and the surface treatment agent, and is present in a state of tight attachment to such a degree that removal from the surface of the silica fine particle A does not occur even when the silica fine particle A is washed with hexane. As a consequence, it has a low molecular mobility and the occurrence of a large peak area in solid-state CP/MAS $^{29}$Si-NMR measurement is facilitated.

The D2 unit structure in silica fine particle A, on the other hand, primarily derives from a silicone oil molecular structure attached to the surface of the silica fine particle substrate at a strength at a level that permits removal from the surface of the silica fine particle A when the silica fine particle A is washed with hexane. As a consequence, it has a high molecular mobility and the occurrence of a small peak area in solid-state CP/MAS $^{29}$Si-NMR measurement is facilitated.

When the molecular mobility originating with this D2 unit structure is excessively large, release or volatilization of silicone oil from the silica fine particle A surface readily occurs due to excitation from the outside, such as the discharge energy, becoming a cause of contamination of, e.g., the charging member.

The silica fine particle A has the D1 unit structure and D2 unit structure at its surface. The D2 unit structure has a structure similar to that of silicone oil and thus has a high affinity with silicone oil. In addition, the D1 unit structure has the polar —OR group at the molecular terminal. Due to this, in connection with the polarity of the surface of the silica fine particle substrate, the molecular mobility of the D2 unit structure present between the —OR group and the surface of the silica fine particle substrate can be inhibited. As a result, the silicone oil contained by the silica fine particle A has a molecular mobility controlled to be low, and, even upon the application of excitation from the outside, such as the discharge energy, release or volatilization of silicone oil from the surface of the silica fine particle A is impeded and contamination of, e.g., the charging member, is restrained.

The best performance for such an effect was shown to appear when SD2/SD1 is 0.05 to 0.30 in solid-state CP/MAS $^{29}$Si-NMR measurement of the silica fine particle A. That is, SD2/SD1 is 0.05 to 0.30. By having SD2/SD1 be in the indicated range, the effect of preventing silicone oil-induced hollow defects during transfer and image chipping is obtained to a satisfactory degree and a toner is obtained that is resistant to causing contamination of, e.g., the charging member. SD2/SD1 is preferably 0.10 to 0.28 and is more preferably 0.12 to 0.27.

When the silica fine particle A must be separated from the toner particle when these properties are measured on the silica fine particle A, measurement can be carried out after separation by the method described below. Since separation in an aqueous medium is carried out in the separation method described below, silicon compound elution into the medium does not occur. As a result, separation of the silica fine particle A from the toner particle can be carried out with the properties of the silica fine particle A prior to the separation step being retained as such. Due to this, the values of the various properties measured using the silica fine particle A separated from the toner particle are substantially the same as the values of the various properties measured using the silica fine particle A prior to external addition.

Method for Measuring the Solid-State $^{29}$Si-NMR

The conditions in the solid-state $^{29}$Si-NMR measurement are specifically as follows.

Instrument: JNM-ECA400 (JEOL RESONANCE)
Calibration: tetramethylsilane (TMS) for 0 ppm
Temperature: room temperature
Measurement method: CP/MAS method, $^{29}$Si, 45°
Sample tube: zirconia, 8.0 mmø
Sample: the sample tube is filled with a powder of silica fine particle A
Sample spinning rate: 6 kHz
Relaxation delay: 90 s
Scans: 5640

The PD1 peak corresponding to silicon atoms having the D1 unit structure and the PD2 peak corresponding to silicon atoms having the D2 unit structure are obtained by carrying out peak separation of the peak originating with the siloxane chain that is observed in the vicinity of −20 ppm in the NMR spectrum yielded by measurement as described above; the peak areas SD1 and SD2 are determined from the respective peaks. Peak separation is carried out using the procedure described in the following.

Peak Separation Method

Peak separation is carried out by analysis of the data in the NMR spectrum yielded by the method described above. Commercial software or an in-house program may be used in the execution of peak separation by the following procedure.

Peak separation processing is carried out using the Voigt function with the peak positions being established, respectively, at −18.2 ppm for the position of the PD1 peak and at −21.0 ppm for the position of the PD2 peak.

Method for Separating the Silica Fine Particle A from the Toner Particle 20 g of a 10 mass % aqueous solution of "Contaminon N" (neutral pH 7 detergent for cleaning precision measurement instrumentation, comprising a nonionic surfactant, anionic surfactant, and organic builder) is weighed into a vial with a 50 mL capacity and mixing with 1 g of the toner is carried out.

This is set in a "KM Shaker" (model: V.SX, Iwaki Sangyo Co., Ltd.) and shaking is carried out for 30 seconds with the speed set to 50. This results in the transfer of the silica fine particle A from the toner particle surface to the aqueous solution side. In the case of a magnetic toner containing a magnetic body, this is followed by separation of the silica fine particles that have transferred into the supernatant, with the toner particles being constrained using a neodymium magnet. The sedimented toner is dried and solidified using a vacuum dryer (40° C./24 hours) and the silica fine particles are obtained.

In the case of a nonmagnetic toner, a centrifugal separator (H-9R, Kokusan Co., Ltd.) (5 minutes at 1,000 rpm) is used to separate the toner particles from the silica fine particles transferred into the supernatant.

When an external additive besides the silica fine particle A has been externally added to the toner, the silica fine particle A can be separated from the other external additive by carrying out a centrifugal separation process on the external additives that have been separated from the toner using the method described above. Even when a plurality of silica fine particle species have been externally added to the toner, they can be separated using a centrifugal separation process as long as they have different particle diameter ranges. For example, separation can be performed using conditions of 40,000 rpm for 20 minutes using a CS120FNX from Hitachi Koki Co., Ltd.

The carbon loss ratio when the silica fine particle A is washed with hexane (also referred to hereafter simply as the carbon loss ratio) is 5 to 70%.

A loss or reduction in carbon upon washing with hexane indicates that the silica fine particle A has a free carbon component. Silicone oil is an example of this free carbon component. In addition, it is thought that a carbon loss ratio in the given range upon washing with hexane indicates that the D1 unit structure and D2 unit structure are tightly bound to the surface of the silica fine particle substrate, or are bonded thereto with or without an interposed siloxane structure.

A release effect that is the same as or similar to that of conventional silica fine particles can be obtained by controlling the carbon loss ratio into the aforementioned range. As a result, the environmental dependence can be attenuated, the temporal stability can be improved, hollow defects during transfer can be suppressed, and member contamination by the external additive and silicone oil can be suppressed.

In order to be able to effectively suppress the member contamination caused by the free carbon component, the carbon loss amount is preferably 10 to 70%, more preferably 25 to 65%, and still more preferably 30 to 55%.

The carbon loss ratio can be controlled through, for example, a two-stage surface treatment using a siloxane bond-containing surface treatment agent and silicone oil, the silicone oil treatment amount, the surface treatment temperature, and the surface treatment time. This carbon loss ratio can be increased by, for example, increasing the silicone oil treatment amount, reducing the surface treatment temperature, and shortening the surface treatment time. On the other hand, the carbon loss ratio can be lowered by, for example, decreasing the silicone oil treatment amount, raising the surface treatment temperature, and extending the surface treatment time.

Measurement of the Carbon Loss Ratio when the Silica Fine Particle A is Washed with Hexane 1.0 g of the silica fine particle is weighed into a 50-mL screw-cap vial and 20 mL of normal-hexane is added. This is followed by extraction for 10 minutes using an ultrasound homogenizer (VP-050 from the TAITEC Corporation) at an intensity of 20 (10 W output). The resulting extract is separated using a centrifugal separator, the supernatant is removed, and the resulting moist sample is subjected to evaporative removal of the normal-hexane using an evaporator to obtain a post-hexane-wash silica fine particle.

Using a total nitrogen/total carbon analyzer (Sumigraph NC-22F, Sumika Chemical Analysis Service, Ltd.), the amount of carbon in the silica fine particle is measured both before and after the hexane wash, and the carbon loss ratio (%) is then calculated using the following formula.

{(amount(mass %) of carbon in the silica particle before the hexane wash)−(amount(mass %) of carbon in the silica particle after the hexane wash)}/(amount(mass %) of carbon in the silica particle before the hexane wash)×100

The silica fine particle A has the D2 unit structure after the silica fine particle A has been washed with hexane. Analysis of the post-hexane-wash silica fine particle A using the previously described solid-state $^{29}$Si-NMR measurement method can be used to confirm that the silica fine particle A has the D2 unit structure after the silica fine particle A has been washed with hexane.

That is, a peak PD1w corresponding to the silicon atom indicated by $Si^a$ in the structure given by Formula (1) and a peak PD2w corresponding to the silicon atom indicated by $Si^b$ in the structure given by Formula (2) are measured in solid-state CP/MAS $^{29}$Si-NMR measurement of said silica fine particle after washing thereof with hexane.

It is thought that the silica fine particle A having the D2 unit structure after the silica fine particle A has been washed with hexane indicates that some of the D2 unit structures are tightly bound to the surface of the silica fine particle substrate, or are bonded thereto with or without an interposed siloxane structure.

SD2w/SD1w is 0.05 or more where SD1w is the area of the PD1w peak and SD2w is the area of the PD2w peak. Compliance with this range enables confirmation that the silica fine particle A has the D2 unit structure even after washing with hexane. SD2w/SD1w is preferably 0.05 to 0.34, more preferably 0.13 to 0.32, and still more preferably 0.17 to 0.30.

The indicated carbon loss ratio can be readily satisfied by having the D2 unit structure be bound to the surface of the silica fine particle substrate in accordance with the condition as described in the preceding.

This binding condition for the D2 unit structure can be adjusted through, for example, a two-stage surface treatment using a siloxane bond-containing surface treatment agent and silicone oil, the surface treatment temperature, and the surface treatment time.

In addition, the component released when the silica fine particle A is washed with hexane preferably comprises silicone oil. Silicone oil has the D2 unit structure.

That the component released when the silica fine particle A is washed with hexane contains D2 unit structure-containing silicone oil, is thought to indicate that silicone oil weakly bound to the silica fine particle substrate surface is present.

Separation of the extracted material from the hexane solution and execution of compositional analysis can be used to confirm that the component released when the silica fine particle A is washed with hexane contains the D2 unit structure.

Method for Analyzing the Component Released when the Silica Fine Particle A is Washed with Hexane Specifically, 0.5 g of a silica fine particle A sample and 32 mL normal-hexane are placed in a 50-mL centrifuge tube and ultrasound dispersion/suspension is carried out for 30 minutes using an ultrasound cleaner (1510JMTH, Yamato Scientific Co., Ltd.). The resulting suspension is subjected to centrifugal separation and a liquid phase (silicone oil) is separated and recovered.

This separated and recovered material can be confirmed to be silicone oil by acquiring an infrared absorption spectrum of silicone oil prepared as an authentic sample and comparing this with the separated and recovered material.

An amount of released component on a carbon basis for the silica fine particle A, relative to 100 parts by mass of the silica fine particle A, is preferably 1.0 to 20.0 parts by mass, more preferably 3.0 to 9.0 parts by mass, still more preferably 5.0 to 8.0 parts by mass, and particularly preferably 6.0 to 8.0 parts by mass. Having the amount of released component be in the indicated range makes it possible to better suppress the member contamination caused by the free carbon component and enables suppression of the hollow defects during transfer. This is also connected, in relation to the toner charging performance, to suppression of environmental dependence and improvements in the temporal stability.

The amount of the released component on a carbon basis for the silica fine particle A can be increased by, for example, increasing the silicone oil treatment amount, reducing the surface treatment temperature, and shortening the surface treatment time. The amount of the released component on a carbon basis for the silica fine particle A can be lowered by, for example, decreasing the silicone oil treatment amount, raising the surface treatment temperature, and extending the surface treatment time.

Method for Measuring the Amount of Released Component on a Carbon Basis for the Silica Fine Particle A The amount of the released component on a carbon basis for silica fine particle A can be determined by measuring the amount of silicone oil that is eluted upon immersion in normal-hexane.

Specifically, 0.5 g of a silica fine particle A sample and 32 mL normal-hexane are placed in a 50-mL centrifuge tube and ultrasound dispersion/suspension is carried out for 30 minutes using an ultrasound cleaner (1510JMTH, Yamato Scientific Co., Ltd.). The resulting suspension is subjected to centrifugal separation and a solid phase (silica) is separated and recovered. Another 32 mL normal-hexane is added to the recovered silica, and the process of ultrasound dispersion and centrifugal separation is carried out a total of three times, followed by drying under reduced pressure (120° C., 12 hours) to obtain a dry powder.

The carbon content of this powder is measured using a total nitrogen/total carbon analyzer (Sumigraph NC-22F, Sumika Chemical Analysis Service, Ltd.). The total carbon content in a 0.5 g sample is also preliminarily measured, and the difference from this total carbon content is calculated to give the amount of the extracted released component.

From the standpoint of the environmental dependence and temporal stability, the BET specific surface area of the silica fine particle A is preferably 30 to 170 $m^2/g$, more preferably 40 to 160 $m^2/g$, still more preferably 60 to 160 $m^2/g$, particularly preferably 70 to 160 $m^2/g$, and especially preferably 74 to 155 $m^2/g$.

By having the BET specific surface area of the silica fine particle A be in the indicated range, the silica fine particle A can then coat the toner particle to a suitable degree and the effects possessed by the silica fine particle A can be better exhibited. As a result, even when a high discharge energy is applied in the charging step, the siloxane structure-bearing compounds present at the surface of the silica fine particle A more readily stay in place and are more resistant to discharge energy-induced detachment and member contamination can be suppressed even further.

In addition, the charge retention can be further enhanced because the state of the charge at the toner surface is kept more constant and the charging state is more stable. Moreover, the siloxane structure-bearing compounds are present suitably freed at the silica fine particle A surface and the releasability of the toner is enhanced. As a result, hollow defects during transfer can be further suppressed even when additional increments in image quality and speed are sought.

The BET specific surface area of the silica fine particle A can be adjusted using, for example, the BET specific surface area of the silica fine particle substrate that is used and the amount of silicone oil.

Measurement of the BET Specific Surface Area of the Silica Particle

The BET specific surface area of the silica fine particle can be determined according to the BET method (the BET multipoint method) using a cryogenic gas adsorption procedure based on a dynamic constant pressure procedure. Using a specific surface area analyzer (product name: Gemini 2375 Ver. 5.0, Shimadzu Corporation), the BET specific surface area ($m^2/g$) can be calculated by measurement carried out using the BET multipoint method and adsorption of nitrogen gas to the sample surface.

From the standpoint of the environmental dependence, an amount of moisture adsorption by the silica fine particle A per 1 $m^2$ of a BET specific surface area at a temperature of 30° C. and a relative humidity of 80% is preferably 0.01 to 0.07 $cm^3/m^2$, more preferably 0.01 to 0.05 $cm^3/m^2$, and still more preferably 0.02 to 0.03 $cm^3/m^2$.

The amount of moisture adsorption by the silica fine particle A is influenced by the state of the silica fine particle A surface. Having the amount of moisture adsorption by the silica fine particle A be in the specified range indicates that the silica fine particle A surface is covered by modifying groups that have a suitable polarity. As a result, the siloxane structure-bearing compounds can be retained more tightly at the silica fine particle A surface.

As a result, even when a high discharge energy is applied in the charging step, the siloxane structure-bearing compounds present at the surface of the silica fine particle A are more prone to stay in place and are more resistant to discharge energy-induced detachment and member contamination can be suppressed even further.

In addition, the charge retention can be further enhanced because the state of the charge at the toner surface is kept more constant and the charging state is more stable. Moreover, the siloxane structure-bearing compounds are present suitably freed at the silica fine particle A surface and the releasability of the toner is enhanced. As a result, hollow defects during transfer can be further suppressed even when additional increments in image quality and speed are sought.

The amount of moisture adsorption by the silica fine particle A can be increased by, for example, reducing the surface treatment temperature and shortening the surface treatment time. The amount of moisture adsorption by the silica fine particle A can be reduced by, for example, increasing the surface treatment temperature and extending the surface treatment time.

Method for Measuring the Amount of Moisture Adsorption

The amount of moisture adsorption by the silica fine particle A is measured using an adsorption equilibration analyzer (BELSORP-aqua3, BEL JAPAN, Inc.). This instrument measures the amount of adsorption of a target gas (water vapor).

Degassing

The moisture adsorbed to the sample is degassed prior to the measurement. The cell, filler rod, and cap are assembled and weighed empty. 0.3 g of sample is weighed and introduced into the cell. The filler rod is inserted into the cell, the cap is attached, and attachment to the degassing port is carried out. The helium valve is opened once all the cells to be measured are attached to the degassing port. The button for a port to be degassed is set to ON and the "VAC" button is pressed. Degassing is performed for at least one day.

Measurement

The power to the main unit (there is a switch on the back side of the main unit) is turned ON. The vacuum pump is also started at the same time. The power to the water circulation unit and the operating panel is turned ON. "BELaqua3.exe" (measurement software) in the center of the PC screen is booted. Temperature control of the hot air bath: "SV" in the "TIC1" frame on the "Flow Diagram" window is double-clicked to open the "Temperature Setting" window. The temperature (80° C.) is entered and Set is clicked.

Adsorption temperature control: "SV" in "Adsorption Temperature" in the "Flow Diagram" window is double-clicked and the "SV value" (adsorption temperature) is entered. "Start Circulation" and "External Temperature Control" are clicked and Set is clicked.

The "PURGE" button is pressed and degassing is stopped, the port button is set to OFF, the sample is removed, cap 2 is attached, the sample is weighed, and the sample is attached to the main measurement unit. "Measurement Conditions" on the PC is clicked to open the "Measurement Conditions Setting" window. The measurement conditions are as follows.

air thermostat tank temperature: 80.0° C., adsorption temperature: 30.0° C., adsorbate name: H2O, equilibration time: 500 sec, temperature hold: 60 min, saturated vapor pressure: 4.245 kPa, sample tube pumping speed: normal, chemical adsorption measurement: no, initial amount introduced: 0.20 $cm^3$ (STP) $g^{-1}$, number of measurement relative pressure ranges: 4.

The number of samples to be measured is selected and the "Measurement Data File Name" and "Sample Weight" are entered. The measurement is started.

Analysis

The analysis software is booted and analysis is performed and the amount of moisture adsorption per unit mass ($cm^3/g$)

at a relative vapor pressure of 80% is calculated. The amount of moisture adsorption per surface area ($cm^3/m^2$) is then determined by dividing the calculated amount of moisture adsorption per unit mass by the BET specific surface area of the silica fine particle yielded by the previously described method.

Known materials can be used for the silica fine particle substrate, which is a silica fine particle prior to surface treatment. Examples in this regard are the fumed silicas produced by the combustion in an oxyhydrogen flame of a silicon compound, particularly a silicon halide, generally a silicon chloride, and commonly a purified silicon tetrachloride; wet silicas produced from water glass; sol-gel method silica particles obtained by a wet method; gel method silica particles; aqueous colloidal silica particles; alcoholic silica particles; fused silica particles obtained by a vapor phase method; and deflagration method silica particles. Fumed silicas are preferred.

The silica fine particle A preferably comprises at its surface a siloxane structure-bearing compound. The silica fine particle A is preferably obtained by carrying out a heat treatment (first-stage treatment) in which a silica fine particle substrate is mixed with a siloxane bond-containing surface treatment agent, and by subsequently carrying out a treatment with a silicone oil (second-stage treatment). When the silicone oil treatment is performed, due to the presence of a siloxane structure-bearing compound at the surface of the silica fine particle A, binding occurs due to a partial chemical reaction between the silicone oil and the siloxane structure-bearing compound. The unreacted silicone oil, on the other hand, is present at the surface of the silica fine particle A as a free component.

Due to the binding by the partial chemical reaction between the silicone oil and the siloxane structure-bearing compound, the silica fine particle A has a high affinity for the silicone oil present as a free component at the surface of the silica fine particle A. This enables a stabilization of the state of occurrence of the silicone oil present as a free component. It is thought that as a result, even upon the impingement of higher energies than heretofore, volatilization can be suppressed and silicone oil-based member contamination can be suppressed.

In the present disclosure, "silica fine particle A" includes the surface treatment agent-derived portions when the silica fine particle A has been surface-treated with a surface treatment agent, e.g., silicone oil. A silica fine particle prior to surface treatment is also referred to as a "silica fine particle substrate".

The toner production method preferably contains a step of obtaining the silica fine particle A and a step of obtaining a toner by mixing a toner particle with the silica fine particle A. In addition, the toner production method preferably has a step of providing the silica fine particle A yielded by the following step.

The step of obtaining the silica fine particle A preferably has:

obtaining a surface-treated material from the silica fine particle substrate by the action of the siloxane bond-containing surface treatment agent by mixing a silica fine particle substrate with a siloxane bond-containing surface treatment agent (preferably a cyclic siloxane) and carrying out a heat treatment at a temperature of 295° C. or more (preferably 300° C. or more); and obtaining a silica fine particle A by further treating the surface-treated material with silicone oil.

Besides being obtained by treating the surface of the silica fine particle substrate with a siloxane bond-containing surface treatment agent and a silicone oil, the silica fine particle A may be obtained by treating the surface of the silica fine particle substrate with another siloxane bond-containing surface treatment agent.

The siloxane bond-containing surface treatment agent is not particularly limited and known materials may be used. Surface treatment of the silica fine particle substrate is preferably performed in order to facilitate obtaining the properties described in the preceding.

The siloxane bond-containing surface treatment agent can be exemplified by silicone oils, e.g., dimethylsilicone oil; silicone oils provided by the modification of a dimethylsilicone oil with an organic group in side chain or terminal position, e.g., methylhydrogensilicone oil, methylphenylsilicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, and fluorine-modified silicone oil; and by cyclic siloxanes, e.g., hexamethylcyclotrisiloxane, octamethylcyclotetrasiloxane, decamethylcyclopentasiloxane.

The siloxane bond-containing surface treatment agent is preferably a cyclic siloxane. Cyclic siloxanes up to 10-membered rings are more preferred. The cyclic siloxane may be a cyclic siloxane in which a portion of the silicon atom-bonded methyl groups have a substituent. The silica fine particle A is preferably a treated material provided by treating silica fine particle with a cyclic siloxane, and further treating the resultant material with a silicone oil. The cyclic siloxane is preferably at least one member selected from the group consisting of hexamethylcyclotrisiloxane, octamethylcyclotetrasiloxane, and decamethylcyclopentasiloxane. The cyclic siloxane more preferably comprises octamethylcyclotetrasiloxane.

The method for performing surface treatment of the silica fine particle substrate is not particularly limited, and surface treatment can be performed by bringing the siloxane bond-containing surface treatment agent into contact with the silica fine particle substrate. Viewed from the standpoint of uniformly treating the surface of the silica fine particle substrate and readily achieving the properties described in the preceding, the surface treatment agent is preferably brought into contact with the silica fine particle substrate by a dry method. Examples, as described in the following, are a method in which a vapor of the surface treatment agent is brought into contact with the silica fine particle substrate, or a method in which contact with the silica fine particle substrate is effected by spraying an undiluted solution of the surface treatment agent or by spraying a dilution thereof with any of various solvents.

The treatment temperature is not particularly limited because it also varies as a function of, e.g., the reactivity of the surface treatment agent being used. A heat treatment at a temperature of 300° C. or more with mixing of the silica fine particle substrate and surface treatment agent is preferred. From 300° C. to 380° C. is more preferred.

By carrying out the heat treatment at a high temperature of 300° C. or more, the units provided by the siloxane bond-containing surface treatment agent that has reacted with the silica surface, react with yet more silica surface, and the molecular structure is then cleaved and the bulkiness of the molecular structure is lowered. It is thought that, as a result, an effective reaction with the silanol groups on the silica fine particle surface is made possible and siloxane structure-bearing compounds can be densely formed on the silica fine particle surface.

The treatment time also varies as a function of the reactivity of the surface treatment agent being used and the treatment temperature, but is preferably from 5 minutes to 300 minutes, more preferably from 30 minutes to 240 minutes, and still more preferably from 60 minutes to 200 minutes. Having the treatment temperature and treatment time of the surface treatment be in the indicated ranges is also preferred from the standpoint of bringing about a satisfactory reaction of the treatment agent with the silica fine particle substrate and from the standpoint of production efficiency.

In a preferred method for contacting the surface treatment agent with the silica fine particle substrate, contact is performed with a vapor of the surface treatment agent under reduced pressure or in an inert gas atmosphere, for example, a nitrogen atmosphere. By using a method in which contact with a vapor is carried out, surface treatment agent that has not reacted with the silica fine particle surface is easily removed and control of the amount of moisture adsorption is facilitated. When the method of contact with a vapor of the surface treatment agent is used, the treatment preferably is performed at a treatment temperature equal to or greater than the boiling point of the surface treatment agent. Contact may be performed divided into a plurality of times (for example, 2 or 3 times).

Octamethylcyclotetrasiloxane is more preferred among the cyclic siloxanes from the standpoints of ease of control of the chain length and ease of purification. The use of octamethylcyclotetrasiloxane enables control to a more uniform chain length and enables a more suitable coverage of the silica fine particle A surface by modifying groups having an appropriate polarity.

As a result, even when a high discharge energy is applied in the charging step, the silicone oil present at the surface of the silica fine particle A is more resistant to discharge energy-induced detachment and member contamination can be suppressed even further. In addition, the charge retention can be further enhanced because the state of the charge at the toner surface is kept more constant and the charging state is more stable.

Moreover, the siloxane structure-bearing compounds are present suitably freed at the silica fine particle A surface and the releasability of the toner is enhanced. As a result, hollow defects during transfer can be further suppressed even when additional increments in image quality and speed are sought.

The amount of the surface treatment agent, relative to 100 parts by mass of the silica fine particle substrate, is preferably from 40 parts by mass to 150 parts by mass and is more preferably from 70 parts by mass to 140 parts by mass. In particular, when the surface treatment is performed by a method in which contact with cyclic siloxane is effected using a vapor, preferably at least 100 parts by mass is added relative to 100 parts by mass of the silica fine particle substrate. This enables a uniform surface treatment of the silica fine particle substrate and as a consequence makes possible a more suitable coverage of the silica fine particle surface by modifying groups having an appropriate polarity.

As a result, even when a high discharge energy is applied in the charging step, the silicone oil present at the surface of the silica fine particle A is more prone to stay in place and is more resistant to discharge energy-induced detachment and member contamination can be suppressed even further. In addition, the charge retention can be further enhanced because the state of the charge at the toner surface is kept more constant and the charging state is more stable. Moreover, the siloxane structure-bearing compounds are present suitably freed at the silica fine particle A surface and the releasability of the toner is enhanced. As a result, hollow defects during transfer can be further suppressed even when additional increments in image quality and speed are sought.

When the surface treatment is carried out under reduced pressure, the pressure within the vessel due to the vapor of the surface treatment agent is preferably brought to from 0.1 Pa to 100.0 Pa and more preferably from 1.0 Pa to 10.0 Pa. By having the pressure be in the indicated range, the frequency of contact between vapor molecules of the surface treatment agent is reduced and surface treatment agent-to-surface treatment agent chemical reactions are then suppressed, and chemical reactions between the silica fine particle substrate and the surface treatment agent in contact with the silica fine particle substrate surface can proceed preferentially.

In addition, secondary reaction products produced by chemical reactions between the silica fine particle substrate and the surface treatment agent are easily removed from the vicinity of the silica fine particle surface and contact by the surface treatment agent with the silica fine particle substrate surface is more easily achieved, and the surface of the silica fine particle substrate can then be more uniformly treated.

When the surface treatment is carried out under reduced pressure, contact between the surface treatment agent and the silica fine particle substrate surface is preferably preceded by the execution of a degassing treatment in which the silica fine particle substrate is heated under reduced pressure; this removes, for example, the moisture adsorbed to the surface of the silica fine particle substrate. By doing this, contact by the surface treatment agent with the silica fine particle substrate surface is more easily achieved and the surface of the silica fine particle substrate can then be more uniformly treated. Moreover, from the standpoint of further facilitating contact between the surface treatment agent and the silica fine particle substrate surface, the degassing treatment and the surface treatment of the silica fine particle by the surface treatment agent are also preferably carried out repeatedly.

After having mixed the silica fine particle substrate with the siloxane bond-containing surface treatment agent and having carried out the heat treatment, the silica fine particle substrate is preferably additionally treated with silicone oil. The heat treatment with silicone oil, which is the second-stage reaction, is preferably carried out at a treatment temperature of 300° C. or more. That is, the temperature when the surface-treated material is further treated with silicone oil is preferably 300° C. or more.

Having the treatment temperature be 300° C. or more facilitates a uniform intermingling of the silicone oil with the silica fine particle surface that has been surface-treated with the cyclic siloxane, and the interaction between the silicone oil and the modifying groups due to the cyclic siloxane at the silica fine particle surface is then strengthened.

As a result, even when a high discharge energy is applied in the charging step, the silicone oil present at the surface of the silica fine particle A is more prone to stay in place and is more resistant to discharge energy-induced detachment and member contamination can be suppressed even further. In addition, the charge retention can be further enhanced because the state of the charge at the toner surface is kept more constant and the charging state is more stable.

Moreover, the siloxane structure-bearing compounds are present suitably freed at the silica fine particle A surface and the releasability of the toner is enhanced. As a result, hollow defects during transfer can be further suppressed even when additional increments in image quality and speed are sought.

The terminal D1 unit structure produced by treatment with the siloxane bond-containing treatment agent, which is the first-stage treatment, also reacts to some degree with the silicone oil, and as a consequence the carbon loss ratio upon washing with hexane can be controlled by having the treatment temperature be 300° C. or more.

From the standpoint of uniformly treating the silica surface, the treatment time with silicone oil is preferably from 40 minutes to 150 minutes and is more preferably from 60 minutes to 120 minutes.

The amount of carbon (mass %) in the silica fine particle after the first-stage treatment is not particularly limited, but is preferably 0.1 to 5.0 mass %, more preferably 0.5 to 4.5 mass %, and still more preferably 1.0 to 4.0 mass %.

The amount of carbon in the silica fine particle after the first-stage treatment can be measured as for the previously described measurement of the carbon loss ratio.

The amount of silicone oil addition, relative to 100 parts by mass of the silica fine particle substrate, is preferably from 3 parts by mass to 25 parts by mass and is more preferably from 5 parts by mass to 20 parts by mass. The use of this amount of addition makes it possible to effectively obtain interaction with the modifying groups provided on the surface of the silica fine particle A by the siloxane bond-containing surface treatment agent, while achieving a uniform treatment of the surface of the silica fine particle A.

As a result, even when a high discharge energy is applied in the charging step, the silicone oil present at the surface of the silica fine particle A is more prone to stay in place and is more resistant to discharge energy-induced detachment and member contamination can be suppressed even further. In addition, the charge retention can be further enhanced because the state of the charge at the toner surface is kept more constant and the charging state is more stable.

Moreover, the siloxane structure-bearing compounds are present suitably freed at the silica fine particle A surface and the releasability of the toner is enhanced. As a result, hollow defects during transfer can be further suppressed even when additional increments in image quality and speed are sought.

From the perspective of controlling the molecular mobility originating with the silicone oil, the kinematic viscosity of the silicone oil at a temperature of 25° C. is preferably 30 to 500 $mm^2/s$, more preferably 40 to 200 $mm^2/s$, and still more preferably 70 to 130 $mm^2/s$. By controlling the kinematic viscosity of the silicone oil at a temperature of 25° C. into the indicated range, the chain length of the silicone oil comes to reside in a suitable range and interaction with the modifying groups provided on the surface of the silica fine particle by the cyclic siloxane can be effectively obtained.

As a result, even when a high discharge energy is applied in the charging step, the silicone oil present at the surface of the silica fine particle A is more prone to stay in place and is more resistant to discharge energy-induced detachment and member contamination can be suppressed even further. In addition, the charge retention can be further enhanced because the state of the charge at the toner surface is kept more constant and the charging state is more stable.

Moreover, the siloxane structure-bearing compounds are present suitably freed at the silica fine particle A surface and the releasability of the toner is enhanced. As a result, hollow defects during transfer can be further suppressed even when additional increments in image quality and speed are sought.

The amount of carbon (mass %) in the silica fine particle after the treatment with silicone oil, which is the second-stage treatment, is not particularly limited, but is preferably 0.2 to 10.0 mass %, more preferably 1.0 to 8.4 mass %, and still more preferably 2.0 to 7.0 mass %.

The amount of carbon in the silica fine particle after the second-stage treatment can be measured as for the previously described measurement of the carbon loss ratio.

Even more advantageous effects are obtained by the use of a combination of the silica fine particle A yielded by the previously described surface treatment method, with a silica fine particle B provided by treatment of the surface of a silica fine particle substrate using a siloxane bond-containing surface treatment agent. That is, the toner preferably additionally comprises a silica fine particle B that is different from the silica fine particle A.

It is thought that the siloxane structure-bearing compounds, such as silicone oil, present at the silica fine particle A surface also interact with appropriately polar modifying groups at the surface of the silica fine particle B. As a consequence, even when a high discharge energy is applied in the charging step, the siloxane structure-bearing compounds, such as silicone oil, are resistant to discharge energy-induced detachment from the silica fine particles A and B and member contamination can be further suppressed.

In addition, the charge retention can be further enhanced because the state of the charge at the toner surface is kept more constant and the charging state is more stable. Moreover, the siloxane structure-bearing compounds are present suitably freed at the silica fine particle A and B surfaces and the releasability of the toner is enhanced. As a result, hollow defects during transfer can be further suppressed even when additional increments in image quality and speed are sought.

The toner production method preferably contains a step of obtaining the silica fine particle B. In addition, the toner production method preferably has a step of providing the silica fine particle B yielded by the following step.

The step of obtaining the silica fine particle B preferably has a step of obtaining a silica fine particle B by mixing a silica fine particle substrate with a siloxane bond-containing surface treatment agent and carrying out a heat treatment at a temperature of 295° C. or more (preferably 300° C. or more) to carry out surface treatment of the surface of the silica fine particle substrate with the siloxane bond-containing surface treatment agent.

That is, the silica fine particle B is preferably a treated material provided by treatment with a siloxane bond-containing surface treatment agent. With regard to the scheme for the surface treatment of the silica fine particle B with the siloxane bond-containing surface treatment agent, this is the same as or similar to the scheme described above in relation to the silica fine particle A. The surface treatment of the silica fine particle B is preferably carried out with contact with the vapor of the siloxane bond-containing surface treatment agent being divided into a plurality of times (for example, 2 to 4 times). Surface treatment of the silica fine particle B is preferably carried out using cyclic siloxane.

The silica fine particle B can be exemplified by the fumed silicas produced by the combustion in an oxyhydrogen flame of a silicon compound, particularly a silicon halide, generally a silicon chloride, and commonly a purified silicon tetrachloride; wet silicas produced from water glass; sol-gel method silica particles obtained by a wet method; gel method silica particles; aqueous colloidal silica particles; alcoholic silica particles; fused silica particles obtained by a vapor phase method; and deflagration method silica particles. Fumed silicas are preferred.

The number-average particle diameter of the silica fine particle B is preferably 5 to 500 nm, more preferably 50 to 300 nm, and still more preferably 80 to 200 nm. In addition, the number-average particle diameter of the silica fine particle B is preferably at least 50 nm larger than the number-average particle diameter of the silica fine particle A. For example, the number-average particle diameter of the silica fine particle B is preferably 50 to 200 nm larger than the number-average particle diameter of the silica fine particle A.

When the number-average particle diameter ranges for the silica fine particle A and the silica fine particle B reside in the aforementioned relationship, the silica fine particle A can—when the siloxane structure-bearing compounds, such as silicone oil, present on the silica fine particle A surface interact with the silica fine particle B surface—spread to an appropriate degree at the silica fine particle B surface without localization.

As a result, even when a high discharge energy is applied in the charging step, the siloxane structure-bearing compounds, such as silicone oil, are more resistant to discharge energy-induced detachment from the silica fine particles A and B and member contamination can be suppressed even further. In addition, the charge retention can be further enhanced because the state of the charge at the toner surface is kept more constant and the charging state is more stable. Moreover, the siloxane structure-bearing compounds are present suitably freed at the silica fine particle A and B surfaces and the releasability of the toner is enhanced. As a result, hollow defects during transfer can be further suppressed even when additional increments in image quality and speed are sought.

Method for Measuring the Number-Average Particle Diameter of the Silica Fine Particle This measurement can be carried out in the range setting of 0.001 μm to 10 μm using an HRA (X-100) Microtrac particle size distribution analyzer (Nikkiso Co., Ltd.).

The determination can also be made by measuring the number and particle diameter (largest diameter) of the silica fine particles present on the toner particle surface during observation of the toner particle using a scanning electron microscope (SEM), whereby a number-average particle diameter that is substantially the same is obtained. Here, an energy-dispersive x-ray analyzer (EDS) attached to the SEM can be used to confirm that the material targeted for measurement is a silica fine particle. When a silica fine particle A+silica fine particle B combination is used, due to the co-use of silica fine particles that exhibit large differences in the particle diameter, as a general matter the average particle diameter can be calculated by establishing a prescribed particle diameter as a dividing line and partitioning into particles larger than this and particles smaller than this. For the dividing line particle diameter, the particle diameter distribution of the silica fine particles on the toner particle surface may be measured and a particle diameter whose frequency is a trough (minimum value sandwiched between maximum values) may be used.

The toner particle may contain a binder resin. A known binder resin can be used in the toner particle. The following are examples of the binder resin:

styrene resins, styrenic copolymer resins, polyester resins, polyol resins, polyvinyl chloride resins, phenolic resins, natural resin-modified phenolic resins, natural resin-modified maleic acid resins, acrylic resins, methacrylic resins, polyvinyl acetate, silicone resins, polyurethane resins, polyamide resins, furan resins, epoxy resins, xylene resins, polyvinyl butyral, terpene resins, coumarone-indene resins, and petroleum resins. Resins preferred for use are styrenic copolymer resins, polyester resins, and hybrid resins provided by mixing a polyester resin with a styrenic copolymer resin or partially reacting the two. The use of polyester resins is preferred.

The components constituting the polyester resin will now be described. A single species or two or more species of the various following components can be used depending on the type and use.

The dibasic carboxylic acid component constituting the polyester resin can be exemplified by the following dicarboxylic acids and their derivatives: benzenedicarboxylic acids and their anhydrides and lower alkyl esters, e.g., phthalic acid, terephthalic acid, isophthalic acid, and phthalic anhydride; alkyl dicarboxylic acids, e.g., succinic acid, adipic acid, sebacic acid, and azelaic acid, and their anhydrides and lower alkyl esters; alkenylsuccinic acids and alkylsuccinic acids having an average value for the number of carbons of from 1 to 50, and their anhydrides and lower alkyl esters; and unsaturated dicarboxylic acids, e.g., fumaric acid, maleic acid, citraconic acid, and itaconic acid, and their anhydrides and lower alkyl esters.

The alkyl group in the lower alkyl esters can be exemplified by the methyl group, ethyl group, propyl group, and isopropyl group.

The dihydric alcohol component constituting the polyester resin, on the other hand, can be exemplified by the following:

ethylene glycol, polyethylene glycol, 1,2-propanediol, 1,3-propanediol, 1,3-butanediol, 1,4-butanediol, 2,3-butanediol, diethylene glycol, triethylene glycol, 1,5-pentanediol, 1,6-hexanediol, neopentyl glycol, 2-methyl-1,3-propanediol, 2-ethyl-1,3-hexanediol, 1,4-cyclohexanedimethanol (CHDM), hydrogenated bisphenol A, bisphenols given by Formula (I-1) and derivatives thereof, and diols given by Formula (I-2).

(I-1)

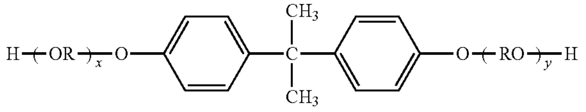

In Formula (I-1), R is the ethylene group or propylene group, x and y are each integers equal to or greater than 0, and the average value of x+y is from 0 to 10.

(I-2)

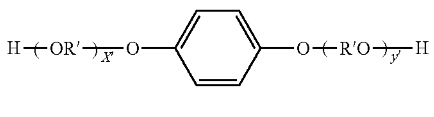

In Formula (I-2), R' is the ethylene group or propylene group, x' and y' are each integers equal to or greater than 0, and the average value of x'+y' is from 0 to 10.

In addition to the aforementioned dibasic carboxylic acid component and dihydric alcohol component, the constituent components of the polyester resin may also contain an at least tribasic carboxylic acid component and an at least trihydric alcohol component.

The at least tribasic carboxylic acid component is not particularly limited and can be exemplified by trimellitic acid, trimellitic anhydride, and pyromellitic acid. The at least trihydric alcohol component can be exemplified by trimethylolpropane, pentaerythritol, and glycerol.

In addition to the aforementioned compounds, the constituent components of the polyester resin may include a monobasic carboxylic acid component and a monohydric alcohol component as constituent components. Specifically, the monobasic carboxylic acid component can be exemplified by palmitic acid, stearic acid, arachidic acid, behenic acid, cerotic acid, heptacosanoic acid, montanic acid, melissic acid, lacceric acid, tetracontanoic acid, and pentacontanoic acid.

The monohydric alcohol component can be exemplified by behenyl alcohol, ceryl alcohol, melissyl alcohol, and tetracontanol.

The toner may be used in the form of a magnetic single-component toner, a nonmagnetic single-component toner, or a nonmagnetic toner contained in a two-component developer.

When used in the form of a magnetic single-component toner, a magnetic iron oxide particle is preferably used as a colorant. The magnetic iron oxide particle contained in a magnetic single-component toner can be exemplified by magnetic iron oxides such as magnetite, maghemite, and ferrite, and by magnetic iron oxides that contain other metal oxides; as well as by metals such as Fe, Co, and Ni, alloys of these metals with metals such as Al, Co, Cu, Pb, Mg, Ni, Sn, Zn, Sb, Be, Bi, Cd, Ca, Mn, Se, Ti, W, and V, and their mixtures. The content of the magnetic iron oxide particle is preferably from 30 parts by mass to 150 parts by mass relative to 100 parts by mass of the binder resin.

Examples of the colorant are provided below for the case of use in the form of a nonmagnetic single-component toner or a nonmagnetic toner contained in a two-component developer.

Carbon black, e.g., furnace black, channel black, acetylene black, thermal black, and lamp black, may be used as a black pigment, as can a magnetic powder such as magnetite and ferrite.

A pigment or dye may be used as a colorant suitable for the color yellow. The pigments can be exemplified by C. I. Pigment Yellow 1, 2, 3, 4, 5, 6, 7, 10, 11, 12, 13, 14, 15, 17, 23, 62, 65, 73, 74, 81, 83, 93, 94, 95, 97, 98, 109, 110, 111, 117, 120, 127, 128, 129, 137, 138, 139, 147, 151, 154, 155, 167, 168, 173, 174, 176, 180, 181, 183, and 191, and C. I. Vat Yellow 1, 3, and 20. The dyes can be exemplified by C. I. Solvent Yellow 19, 44, 77, 79, 81, 82, 93, 98, 103, 104, 112, and 162. A single one of these may be used by itself or two or more may be used in combination.

A pigment or dye may be used as a colorant suitable for the color cyan. The pigments can be exemplified by C. I. Pigment Blue 1, 7, 15, 15:1, 15:2, 15:3, 15:4, 16, 17, 60, 62, and 66; C. I. Vat Blue 6; and C. I. Acid Blue 45. The dyes can be exemplified by C. I. Solvent Blue 25, 36, 60, 70, 93, and 95. A single one of these may be used by itself or two or more may be used in combination.

A pigment or dye may be used as a colorant suitable for the color magenta. The pigments can be exemplified by C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:2, 48:3, 48:4, 49, 50, 51, 52, 53, 54, 55, 57, 57:1, 58, 60, 63, 64, 68, 81, 81:1, 83, 87, 88, 89, 90, 112, 114, 122, 123, 144, 146, 150, 163, 166, 169, 177, 184, 185, 202, 206, 207, 209, 220, 221, 238, and 254; C. I. Pigment Violet 19; and C. I. Vat Red 1, 2, 10, 13, 15, 23, 29, and 35.

The magenta dyes can be exemplified by oil-soluble dyes such as C. I. Solvent Red 1, 3, 8, 23, 24, 25, 27, 30, 49, 52, 58, 63, 81, 82, 83, 84, 100, 109, 111, 121, and 122, C. I. Disperse Red 9, C. I. Solvent Violet 8, 13, 14, 21, and 27, and C. I. Disperse Violet 1, and by basic dyes such as C. I. Basic Red 1, 2, 9, 12, 13, 14, 15, 17, 18, 22, 23, 24, 27, 29, 32, 34, 35, 36, 37, 38, 39, and 40, and C. I. Basic Violet 1, 3, 7, 10, 14, 15, 21, 25, 26, 27, and 28. A single one of these may be used by itself or two or more may be used in combination.

The colorant content is preferably from 1 parts by mass to 20 parts by mass relative to 100 parts by mass of the binder resin.

A release agent (wax) may be used in order to provide the toner with releasability.

The wax can be exemplified by the following: aliphatic hydrocarbon waxes such as low molecular weight polyethylene, low molecular weight polypropylene, olefin copolymers, microcrystalline wax, paraffin wax, and Fischer-Tropsch waxes; oxidized waxes of aliphatic hydrocarbon waxes, such as oxidized polyethylene wax; waxes in which the major component is fatty acid ester, such as carnauba wax, behenyl behenate, and montanic acid ester wax; and waxes provided by the partial or complete deoxidization of fatty acid esters, such as deoxidized carnauba wax.

Additional examples are as follows: saturated straight-chain fatty acids such as palmitic acid, stearic acid, and montanic acid; unsaturated fatty acids such as brassidic acid, eleostearic acid, and valinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinyl comonomer such as styrene or acrylic acid; partial esters between a fatty acid and a polyhydric alcohol, such as behenyl monoglyceride; and hydroxy group-containing methyl ester compounds obtained by, e.g., the hydrogenation of plant oils.

Aliphatic hydrocarbon waxes are waxes particularly preferred for use. Preferred examples are low molecular weight hydrocarbons provided by the high-pressure radical polymerization of alkylene or by the low-pressure polymerization of alkylene in the presence of a Ziegler catalyst or metallocene catalyst; Fischer-Tropsch waxes synthesized from coal or natural gas; paraffin waxes; olefin polymers obtained by the pyrolysis of high molecular weight olefin polymers; and synthetic hydrocarbon waxes obtained from the distillation residue of hydrocarbon obtained by the Arge method from synthesis gas containing carbon monoxide and hydrogen, as well as the synthetic hydrocarbon waxes provided by the hydrogenation of such synthetic hydrocarbon waxes.

The use is more preferred of waxes obtained by subjecting a hydrocarbon wax to fractionation by a press sweating method, solvent method, use of vacuum distillation, or fractional crystallization. Among the paraffin waxes, Fischer-Tropsch waxes and n-paraffin waxes in which the straight-chain component predominates are particularly preferred from the standpoint of the molecular weight distribution.

A single one of these waxes may be used by itself or two or more may be used in combination. The wax is preferably added at from 1 parts by mass to 20 parts by mass relative to 100 parts by mass of the binder resin.

A charge control agent may be used in the toner. Known charge control agents may be used as this charge control agent. Examples here are azo iron compounds, azo chromium compounds, azo manganese compounds, azo cobalt compounds, azo zirconium compounds, chromium compounds of carboxylic acid derivatives, zinc compounds of carboxylic acid derivatives, aluminum compounds of carboxylic acid derivatives, and zirconium compounds of carboxylic acid derivatives.

Aromatic hydroxycarboxylic acids are preferred for the aforementioned carboxylic acid derivative. A charge control resin may also be used. As necessary, a single species of charge control agent may be used or two or more species of charge control agents may be used in combination. The charge control agent is preferably used at from 0.1 parts by mass to 10 parts by mass relative to 100 parts by mass of the binder resin.

The toner may be used in the form of a two-component developer in mixture with a magnetic carrier. An ordinary magnetic carrier, e.g., of ferrite, magnetite, and so forth, or a resin-coated carrier may be used as the magnetic carrier. Also usable are dispersed magnetic body-type resin particles comprising a magnetic powder dispersed in a resin component, or porous magnetic core particles containing a resin in the voids.

The following, for example, can be used for the magnetic body component used in dispersed magnetic body-type resin particles: magnetite particle powder, maghemite particle powder, and magnetic iron oxide particle powder provided by the incorporation in the preceding of at least one selection from the oxides of silicon, the hydroxides of silicon, the oxides of aluminum, and the hydroxides of aluminum; magnetoplumbite-type ferrite particle powder that contains barium, strontium, or barium-strontium; and various magnetic iron compound particle powders, e.g., spinel-type ferrite particle powders that contain at least one selection from manganese, nickel, zinc, lithium, and magnesium.

Other than the magnetic body component, a magnetic iron compound particle powder may be used in combination with a nonmagnetic iron oxide particle powder such as hematite particle powder, a nonmagnetic hydrous ferric oxide particle powder, or a nonmagnetic inorganic compound particle powder such as titanium oxide particle powder, silica particle powder, talc particle powder, alumina particle powder, barium sulfate particle powder, barium carbonate particle powder, cadmium yellow particle powder, calcium carbonate particle powder, and zinc white particle powder.

Magnetite and ferrite are examples of the material of the porous magnetic core particle. A specific example of ferrite is given by the following general formula.

$$(M1_2O)_x(M2O)_y(Fe_2O_3)_z$$

In this formula: M1 is a monovalent metal and M2 is a divalent metal, and x and y are each $0 \leq (x, y) \leq 0.8$ and z is $0.2 < z < 1.0$, where $x+y+z=1.0$.

The use of at least one metal atom selected from the group consisting of Li, Fe, Mn, Mg, Sr, Cu, Zn, and Ca as the M1 and M2 in the formula is preferred. Besides these, e.g., Ni, Co, Ba, Y, V, Bi, In, Ta, Zr, B, Mo, Na, Sn, Ti, Cr, Al, Si, and rare earths may also be used.

The magnetic carrier preferably comprises, for the resin-coated carrier, a magnetic carrier core particle and a resin-coating layer on the surface of the magnetic carrier core particle. The resin-coating layer, for example, coats the surface of the magnetic carrier core particle. The magnetic carrier core particle preferably is a porous magnetic core particle containing a resin in the voids.

A thermoplastic resin or a thermosetting resin may be used as the resin filled in the voids of the porous magnetic core particle.

Thermoplastic resins for use as this fill resin can be exemplified by novolac resins, saturated polyester resins, polyarylates, polyamide resins, and acrylic resins.

The thermosetting resins can be exemplified by phenolic resins, epoxy resins, unsaturated polyester resins, and silicone resins.

The method for coating the magnetic carrier core particle surface with the resin is not particularly limited, and examples are methods that carry out coating by a coating method such as an immersion method, a spray method, a brush coating method, or a fluidized bed. Immersion methods are preferred among these.

In order to control toner chargeability, the amount of resin coating the magnetic carrier core particle surface (i.e., the amount of the resin-coating layer) is preferably from 0.1 parts by mass to 5.0 parts by mass relative to 100 parts by mass of the magnetic carrier core particle.

The resin used for the resin-coating layer can be exemplified by acrylic resins, e.g., acrylate ester copolymers and methacrylate ester copolymers; styrene-acrylic resins, e.g., styrene-acrylate ester copolymers and styrene-methacrylate ester copolymers; fluorine-containing resins, e.g., polytetrafluoroethylene, tetrafluoroethylene hexafluoropropylene copolymers, monochlorotrifluoroethylene polymers, and polyvinylidene fluoride; as well as silicone resins, polyester resins, polyamide resins, polyvinyl butyral, aminoacrylate resins, ionomer resins, and polyphenylene sulfide resins.

A single of these resins may be used or a plurality may be used in combination. Acrylic resins are preferred.

Among the preceding, copolymers containing a (meth)acrylate ester having an alicyclic hydrocarbon group are particularly preferred from the standpoint of charge stability. The resin for the resin-coating layer preferably has a monomer unit provided by a (meth)acrylate ester having an alicyclic hydrocarbon group. That is, the resin of the resin-coating layer contains a polymer of monomer comprising at least a (meth)acrylate ester having an alicyclic hydrocarbon group.

Preferred examples of (meth)acrylate ester having an alicyclic hydrocarbon group are, e.g., cyclobutyl acrylate, cyclopentyl acrylate, cyclohexyl acrylate, cycloheptyl acrylate, dicyclopentenyl acrylate, dicyclopentanyl acrylate, cyclobutyl methacrylate, cyclopentyl methacrylate, cyclohexyl methacrylate, cycloheptyl methacrylate, dicyclopentenyl methacrylate, and dicyclopentanyl methacrylate.

The alicyclic hydrocarbon group is preferably a cycloalkyl group, with the number of carbons being preferably 3 to 10 and more preferably 4 to 8. One of these or a selection of two or more of these may be used.

The resin used in the resin-coating layer can be identified using a procedure such as NMR.

The proportion, in the copolymer used in the resin-coating layer, of the monomer unit provided by (meth)acrylate ester having an alicyclic hydrocarbon group (i.e., the copolymerization proportion on a mass basis of the (meth)acrylate ester) is preferably from 5.0 mass % to 80.0 mass %, more preferably from 50.0 mass % to 80.0 mass %, and still more preferably from 70.0 mass % to 80.0 mass %. An excellent charge stability in high-temperature, high-humidity environments is provided when the indicated range is observed.

Moreover, from the standpoints of charge stability, increasing the adherence between the magnetic carrier core particle and the resin-coating layer, and suppressing, e.g., localized exfoliation of the resin-coating layer, the resin in the resin-coating layer more preferably contains a macromonomer as a copolymerization component. An example of a specific macromonomer is given by Formula (B). That is, the resin in the resin-coating layer preferably has a monomer unit provided by macromonomer given by Formula (B).

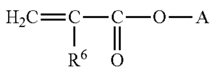

(B)

In Formula (B), A represents a polymer of at least one compound selected from the group consisting of methyl acrylate, methyl methacrylate, butyl acrylate, butyl methacrylate, 2-ethylhexyl acrylate, 2-ethylhexyl methacrylate, styrene, acrylonitrile, and methacrylonitrile. $R^6$ is H or $CH_3$.

The A is preferably a polymer of methyl methacrylate.

In order to improve the adherence between the magnetic carrier core particle and the resin-coating layer, the weight-average molecular weight of the macromonomer is preferably 3,000 to 10,000 and is more preferably 4,000 to 7,000.

In order to improve the adherence between the magnetic carrier core particle and the resin-coating layer, the proportion of the macromonomer-derived monomer unit in the resin used in the resin-coating layer is preferably from 0.5 mass % to 30.0 mass %, more preferably from 10.0 mass % to 30.0 mass %, and still more preferably from 20.0 mass % to 25.0 mass %.

Measurement of the Weight-Average Molecular Weight of the Macromonomer

The weight-average molecular weight is measured using gel permeation chromatography (GPC) and using the following procedure.

The measurement sample is first prepared as follows.

A sample (the coating resin is separated from the magnetic carrier and is fractionated with a fractionator to give the sample) is mixed at a concentration of 5 mg/mL with tetrahydrofuran (THF), and the sample is dissolved in the THF by standing for 24 hours at room temperature. This is followed by filtration across a sample treatment filter (Sample Pretreatment Cartridge H-25-2, Tosoh Corporation) to provide the GPC sample.

The measurement is then run using a GPC measurement instrument (HLC-8120GPC, Tosoh Corporation) in accordance with the operating manual provided with the instrument and using the following measurement conditions.

Measurement CONDITIONS

Instrument: "HLC8120 GPC" high-performance GPC (Tosoh Corporation)

Column: 7-column train of Shodex KF-801, 802, 803, 804, 805, 806, and 807 (Showa Denko Kabushiki Kaisha)

Eluent: THF

Flow rate: 1.0 mL/min

Oven temperature: 40.0° C.

Amount of sample injection: 0.10 mL

For the calibration curve, a molecular weight calibration curve constructed using polystyrene resin standards (Tosoh Corporation, TSK Standard Polystyrene F-850, F-450, F-288, F-128, F-80, F-40, F-20, F-10, F-4, F-2, F-1, A-5000, A-2500, A-1000, A-500) is used to determine the weight-average molecular weight of the sample.

The toner comprises the toner particle and the silica fine particle A on the surface of the toner particle. The toner can be obtained by external addition of the silica fine particle A as an external additive to the toner particle. The content of the silica fine particle A in the toner, relative to 100 parts by mass of the toner particle, is preferably 0.01 to 10.00 parts by mass, more preferably 0.20 to 3.00 parts by mass, still more preferably 0.40 to 2.00 parts by mass, even more preferably 0.50 to 1.50 parts by mass, and yet more preferably 0.80 to 1.20 parts by mass.

By doing this, the silica fine particle A can more thoroughly coat the toner particle and the charge stability is made even better and member contamination can be suppressed.

The content of the silica fine particle A can be measured using the previously described method for separating the silica fine particle from the toner particle.

External addition of external additive, e.g., the silica fine particle A and the silica fine particle B, to the toner particle can be carried out by mixing the toner particle with the external additive using a mixer as described in the following.

The mixer can be exemplified by the following: Henschel mixer (Mitsui Mining Co., Ltd.); Supermixer (Kawata Mfg. Co., Ltd.); Ribocone (Okawara Corporation); Nauta mixer, Turbulizer, and Cyclomix (Hosokawa Micron Corporation); Spiral Pin Mixer (Pacific Machinery & Engineering Co., Ltd.); and Loedige Mixer (Matsubo Corporation).

The method for producing the toner particle in the process of obtaining the toner particle is not particularly limited, and production can be carried out using known methods. Examples here are the pulverization method, emulsion aggregation method, suspension polymerization method, and dissolution suspension method.

A toner particle produced by the pulverization method may be produced, for example, proceeding as follows.

The binder resin, colorant, other optional additives, and so forth are thoroughly mixed using a mixer such as a Henschel mixer or ball mill. The resulting mixture is melt-kneaded using a heated kneader, for example, a twin-screw kneading extruder, hot roll, kneader, or extruder. A wax, magnetic iron oxide particle, and metal-containing compound may also be added at this time.

The melt-kneaded material is cooled and solidified and then pulverized and classified to obtain a toner particle. The toner can be obtained by mixing the external additive, e.g., the silica fine particle A, with the toner particle using a mixer such as a Henschel mixer.

The mixer can be exemplified by the following: Henschel mixer (Mitsui Mining Co., Ltd.); Supermixer (Kawata Mfg. Co., Ltd.); Ribocone (Okawara Corporation); Nauta mixer, Turbulizer, and Cyclomix (Hosokawa Micron Corporation); Spiral Pin Mixer (Pacific Machinery & Engineering Co., Ltd.); and Loedige Mixer (Matsubo Corporation).

The kneader can be exemplified by the following: KRC Kneader (Kurimoto, Ltd.); Buss Ko-Kneader (Buss Corp.); TEM extruder (Toshiba Machine Co., Ltd.); TEX twin-screw kneader (The Japan Steel Works, Ltd.); PCM Kneader (Ikegai Ironworks Corporation); three-roll mills, mixing roll mills, and kneaders (Inoue Manufacturing Co., Ltd.); Kneadex (Mitsui Mining Co., Ltd.); Model MS pressure kneader and Kneader-Ruder (Moriyama Mfg. Co., Ltd.); and Banbury mixer (Kobe Steel, Ltd.).

The pulverizer can be exemplified by the following: Counter Jet Mill, Micron Jet, and Inomizer (Hosokawa Micron Corporation); IDS mill and PJM Jet Mill (Nippon Pneumatic Mfg. Co., Ltd.); Cross Jet Mill (Kurimoto, Ltd.); Ulmax (Nisso Engineering Co., Ltd.); SK Jet-O-Mill (Seishin Enterprise Co., Ltd.); Kryptron (Kawasaki Heavy Industries, Ltd.); Turbo Mill (Turbo Kogyo Co., Ltd.); and Super Rotor (Nisshin Engineering Inc.).

As necessary, pulverization may also be followed by the execution of a surface treatment on the toner particle using a Hybridization System (Nara Machinery Co., Ltd.), Nobilta (Hosokawa Micron Corporation), Mechanofusion System (Hosokawa Micron Corporation), Faculty (Hosokawa Micron Corporation), Inomizer (Hosokawa Micron Corporation), Theta Composer (Tokuju Corporation), Mechanomill (Okada Seiko Co., Ltd.), or Meteo Rainbow MR Type (Nippon Pneumatic Mfg. Co., Ltd.).

The classifier can be exemplified by the following: Classiel, Micron Classifier, and Spedic Classifier (Seishin Enterprise Co., Ltd.); Turbo Classifier (Nisshin Engineering Inc.); Micron Separator, Turboplex (ATP), and TSP Separator (Hosokawa Micron Corporation); Elbow Jet (Nittetsu Mining Co., Ltd.); Dispersion Separator (Nippon Pneumatic Mfg. Co., Ltd.); and YM Microcut (Yasukawa Shoji Co., Ltd.).

Screening devices that can be used to screen out the coarse particles can be exemplified by the following: Ultrasonic (Koei Sangyo Co., Ltd.), Rezona Sieve and Gyro-Sifter (Tokuju Corporation), Vibrasonic System (Dalton Co., Ltd.), Soniclean (Sintokogio, Ltd.), Turbo Screener (Turbo Kogyo Co., Ltd.), Microsifter (Makino Mfg. Co., Ltd.), and circular vibrating sieves.

A toner particle may be produced by the emulsion aggregation method, for example, proceeding as follows.

Step of Preparing a Resin Fine Particle Dispersion (Preparation Step)

For example, a uniform solution is formed by dissolving a binder resin component in an organic solvent. This is followed on an optional basis by the addition of a basic compound and/or a surfactant. Resin fine particles of the binder resin are formed by the gradual addition of an aqueous medium to this solution while applying shear force to the solution using, for example, a homogenizer. The organic solvent is finally removed to produce a resin fine particle dispersion in which resin fine particles are dispersed.

During the preparation of the resin fine particle dispersion, the amount of addition of the resin component that is dissolved in the organic solvent, expressed relative to 100 parts by mass of the organic solvent, is preferably from 10 parts by mass to 50 parts by mass and more preferably from 30 parts by mass to 50 parts by mass.

Any organic solvent capable of dissolving the resin component may be used, but solvents exhibiting a high solubility for olefin resins, e.g., toluene, xylene, ethyl acetate, and so forth, are preferred.

There are no particular limitations on the surfactant. The following are examples: anionic surfactants such as the salts of sulfate esters, sulfonate salts, carboxylate salts, phosphate esters, and soaps; cationic surfactants such as amine salts and quaternary ammonium salts; and nonionic surfactants such as polyethylene glycols, ethylene oxide adducts on alkylphenols, and polyhydric alcohol systems.

The basic compound can be exemplified by inorganic bases such as sodium hydroxide and potassium hydroxide and by organic bases such as triethylamine, trimethylamine, dimethylaminoethanol, and diethylaminoethanol. A single species of basic compound may be used by itself or two or more species may be used in combination.

Aggregation Step

The aggregation step is a step of forming aggregate particles by preparing a mixture by mixing, as necessary, a colorant fine particle dispersion, wax fine particle dispersion, and silicone oil emulsion into the resin fine particle dispersion and then aggregating the fine particles present in the thusly prepared mixture.

A favorable example of the method for forming the aggregate particles is a method in which an aggregating agent is added to and mixed with the mixture and the temperature is raised and/or, e.g., mechanical energy is suitably applied.

The colorant fine particle dispersion is prepared by the dispersion of a colorant as described above. The colorant fine particles are dispersed using a known method, but the use is preferred of, for example, a rotary shear homogenizer; a media-based disperser such as a ball mill, sand mill, or attritor; or a high-pressure countercollision disperser. A surfactant or polymeric dispersing agent that imparts dispersion stability can also be added on an optional basis.

The wax fine particle dispersion and the silicone oil emulsion are prepared by dispersing the respective materials in an aqueous medium. The respective materials may be dispersed using a known method, but the use is preferred of, for example, a rotary shear homogenizer; a media-based disperser such as a ball mill, sand mill, or attritor; or a high-pressure countercollision disperser. A surfactant or polymeric dispersing agent that imparts dispersion stability can also be added on an optional basis.

The aggregating agent can be exemplified by the metal salts of monovalent metals such as sodium, potassium, and so forth; metal salts of divalent metals such as calcium, magnesium, and so forth; metal salts of trivalent metals such as iron, aluminum, and so forth; and polyvalent metal salts such as polyaluminum chloride. Viewed from the standpoint of the ability to control the particle diameter in the aggregation step, metal salts of divalent metals, e.g., calcium chloride, magnesium sulfate, and so forth, are preferred.

The addition and mixing of the aggregating agent is preferably carried out in the temperature range from room temperature to 75° C. When mixing is performed using this temperature condition, it proceeds in a state in which the aggregation is stable. Mixing can be carried out using, for example, a known mixing apparatus, homogenizer, or mixer.

Fusion Step

The fusion step is a step in which the aggregate particle is fused or coalesced, preferably by heating to at least the melting point of the olefin resin, to produce a particle in which the surface of the aggregate particle has been smoothened.

Prior to the fusion step, for example, a chelating agent, pH regulator, surfactant, and so forth may be introduced as appropriate in order to prevent the obtained resin particles from melt-adhering to each other.

The chelating agent can be exemplified by ethylenediaminetetraacetic acid (EDTA) and its alkali metal salts, for example, its Na salt; sodium gluconate; sodium tartrate; potassium citrate and sodium citrate; nitrilotriacetate (NTA) salts; and highly water-soluble polymers that contain both the COOH and OH functionalities (polyelectrolytes).

With regard to the duration of the fusion step, shorter times will suffice at higher heating temperatures while longer times will be required at lower heating temperatures. Thus, the duration of heating/fusion cannot be unconditionally specified because it depends on the heating temperature; however, it will generally be about from 10 minutes to 10 hours.

Cooling Step

This is a step of cooling the temperature of the resin particle-containing aqueous medium obtained in the fusion step. While not a particular limitation, a specific cooling rate is about 0.1 to 50° C./minute.

Washing Step

The impurities in the resin particle can be removed by subjecting the resin particles produced via the preceding steps to repeated washing and filtration.

Specifically, preferably the resin particle is washed using an aqueous solution containing a chelating agent, e.g., ethylenediaminetetraacetic acid (EDTA) or its sodium salt, and additionally washed with pure water.

The metal salt, surfactant, and so forth in the resin particle can be removed by repeating the pure water wash+filtration a plurality of times. Filtration is performed preferably from 3 to 20 times from the standpoint of the production efficiency, with 3 to 10 times being more preferred.

Drying and Classification Step

The toner particle can be obtained by drying the washed resin particle and carrying out classification as appropriate.

A toner particle produced by the dissolution suspension method may be produced, for example, proceeding as follows.

In the dissolution suspension method, a resin composition is obtained by dissolving the binder resin component in an organic solvent; this resin composition is dispersed in an aqueous medium to granulate the resin composition into particles; and the organic solvent present in the resin composition particles is removed to produce a toner particle.

The dissolution suspension method is adaptable as long as the resin component can dissolve in an organic solvent, and in addition provides for easy shape control as a function of the conditions in solvent removal.

A toner production method using the dissolution suspension method is specifically described in the following, but there is no limitation to this.

Resin Component Dissolution Step

In the resin component dissolution step, the binder resin and as necessary other components, e.g., colorant, wax, silicone oil, and so forth, are dissolved or dispersed in an organic solvent to prepare a resin composition.

Any solvent that is an organic solvent that can dissolve the resin component can be used as the organic solvent used here. Specific examples are toluene, xylene, chloroform, methylene chloride, and ethyl acetate. The use of toluene and ethyl acetate is preferred for the ease of solvent removal and promotion of crystallization of crystalline resin.

The amount of use of the organic solvent is not limited, but should be an amount that provides a viscosity that enables the resin composition to disperse and granulate in a poor solvent, e.g., water. Specifically, the mass ratio between the resin component and optional other components, e.g., colorant, wax, and silicone oil, and the organic solvent is preferably 10/90 to 50/50 from the standpoints of the granulatability, infra, and the toner particle production efficiency.

On the other hand, the colorant, wax, and silicone oil need not undergo dissolution in the organic solvent and may undergo dispersion. When the colorant, wax, and silicone oil are employed in a dispersed condition, dispersion is preferably performed using a disperser such as a bead mill.

Granulation Step

The granulation step is a step of producing particles of the obtained resin composition by dispersing the resin composition in an aqueous medium using a dispersing agent so as to provide a prescribed toner particle diameter.

Water is mainly used as the aqueous medium.

In addition, this aqueous medium preferably contains from 1 mass % to 30 mass % of a monovalent metal salt. The incorporation of the monovalent metal salt serves to suppress diffusion of the organic solvent in the resin composition into the aqueous medium and to increase the crystallinity of the resin component present in the resulting toner particle.

This facilitates the appearance of an excellent antiblocking behavior by the toner and facilitates the appearance of an excellent particle size distribution for the toner.

The monovalent metal salt can be exemplified by sodium chloride, potassium chloride, lithium chloride, and potassium bromide, whereamong sodium chloride and potassium chloride are preferred.

In addition, the mixing ratio (mass ratio) between the aqueous medium and resin composition is preferably aqueous medium/resin composition=90/10 to 50/50.

There are no particular limitations on the dispersing agent, and a cationic, anionic, or nonionic surfactant is used as an organic dispersing agent, wherein anionic surfactants are preferred.

Examples here sodium alkylbenzenesulfonate, sodium α-olefinsulfonate, sodium alkylsulfonate, and sodium alkyl diphenyl ether disulfonate. Inorganic dispersing agents, on the other hand, can be exemplified by tricalcium phosphate, hydroxyapatite, calcium carbonate fine particles, titanium oxide fine particles, and silica fine particles.

The inorganic dispersing agent tricalcium phosphate is preferred among the preceding. The reasons for this are its granulation performance and stability and because it has very little negative effect on the properties of the resulting toner.

The amount of addition of the dispersing agent is determined in conformity to the particle diameter of the granulate, and larger amounts of dispersing agent addition provide smaller particle diameters. Due to this, the amount of addition for the dispersing agent will vary depending on the desired particle diameter, but use in the range of 0.1 to 15 mass % with reference to the resin composition is preferred.

The production of the resin composition particles in the aqueous medium is preferably carried out under the application of high-speed shear. Devices that apply high-speed shear can be exemplified by various high-speed dispersers and ultrasound dispersers.

Solvent Removal Step

In the solvent removal step, the organic solvent contained in the resulting resin composition particle is removed to produce a toner particle. This organic solvent removal may be performed while stirring.

Washing, Drying, and Classification Step

After the solvent removal step, a washing and drying step may be executed in which washing is performed a plurality of times with, e.g., water, and the toner particle is then filtered off and dried. When a dispersing agent that dissolves under acidic conditions, e.g., tricalcium phosphate, has been used as the dispersing agent, preferably washing with, e.g., hydrochloric acid, is carried out followed by washing with water. The execution of washing can remove the dispersing agent used for granulation. The toner particle can be obtained by following washing with filtration, drying, and classification as appropriate.

A toner particle produced by the suspension polymerization method may be produced, for example, as follows.

A polymerizable monomer composition is prepared in which polymerizable monomer that will produce the binder resin, colorant, a wax component, a polymerization initiator, and so forth, are dissolved or dispersed to uniformity using a disperser such as a homogenizer, ball mill, ultrasound disperser, and so forth. After granulation of the polymerizable monomer composition into particles by dispersing the polymerizable monomer composition in an aqueous medium, a toner particle is obtained by polymerizing the polymerizable monomer in the particles composed of the polymerizable monomer composition.

This polymerizable monomer composition preferably is a polymerizable monomer composition prepared by mixing a dispersion of the colorant dispersed in a first polymerizable monomer (or a portion of the polymerizable monomer) with at least a second polymerizable monomer (or the remaining polymerizable monomer). That is, the presence of the colorant in the polymer particle in a more thoroughly dispersed state can be achieved by bringing the colorant into a thoroughly dispersed state in the first polymerizable monomer and subsequently mixing with the second polymerizable monomer along with other toner materials.

As necessary, the obtained toner particle may be filtered, washed, dried, and classified using known methods.

Step of Adding External Additive to the Toner Particle

Toner can be obtained by mixing the toner particle and external additive (silica fine particle A and optionally silica fine particle B) using a mixer such as a Henschel mixer.

When both silica fine particle A and silica fine particle B are used, silica fine particle A and silica fine particle B may be externally added to the toner particle once. As noted above, the external addition of silica fine particle B and the external addition of silica fine particle A are preferably carried out divided up.

In the step of externally adding the silica fine particle B to the obtained toner particle by mixing, the silica fine particle B may be mixed with the toner particle, for example, using a mixer such as a Henschel mixer.

The weight-average particle diameter (D4) of the toner is 4.0 to 15.0 μm. 4.0 to 9.0 μm is preferred and 6.0 to 8.0 μm is more preferred.

As a result of this, the silica fine particle A can suitably coat the toner particle, and in addition the area of contact between the silica fine particle A and the toner particle is optimized, a better charge stability is provided, there will be little fluctuation in the image density even in the event of changes in the environment, and changes in the image density during continuous printing can be suppressed.

The weight-average particle diameter (D4) of the toner can be adjusted, for example, by carrying out classification of the toner particle.

Method for Measuring Weight-Average Particle Diameter (D4) of Toner

The weight-average particle diameter (D4) of the toner is calculated by using a precision particle diameter distribution measuring device "Coulter Counter Multisizer 3" (registered trademark, manufactured by Beckman Coulter, Inc.), which is based on a pore electrical resistance method and equipped with a 100 m aperture tube, and dedicated software "Beckman Coulter Multisizer 3 Version 3.51" (manufactured by Beckman Coulter, Inc.) provided therewith for setting measurement conditions and analyzing the measurement data, performing measurements at the number of effective measurement channels of 25,000 and analyzing the measurement data.

For the electrolytic aqueous solution used for measurement, a solution in which special grade sodium chloride is dissolved in ion-exchanged water so that the concentration is about 1% by mass, for example, "ISOTON II" (manufactured by Beckman Coulter, Inc.) can be used.

Before performing the measurement and analysis, the dedicated software is set as follows.

At the "Change Standard Measurement Method (SOM) Screen" of the dedicated software, the total number of counts in control mode is set to 50,000 particles, the number of measurements is set to 1, and a value obtained using "Standard Particle 10.0 μm" (manufactured by Beckman Coulter Co., Ltd.) is set as the Kd value. The threshold and noise level are automatically set by pressing the threshold/noise level measurement button. Also, the current is set to 1600 μA, the gain is set to 2, the electrolytic solution is set to ISOTON II, and the flash of aperture tube after measurement is checked.

At the "Pulse to Particle Diameter Conversion Setting Screen" of the dedicated software, the bin interval is set to logarithmic particle diameter, the particle diameter bin is set to a 256 particle diameter bin, and the particle diameter range is set to from 2 μm to 60 μm.

The specific measurement method is as follows.

(1) About 200 ml of the electrolytic aqueous solution is placed in a 250 ml round-bottom glass beaker exclusively provided for Multisizer 3, the beaker is set on a sample stand, and a stirrer rod is stirred counterclockwise at 24 revolutions/second. Then, the dirt and air bubbles inside the aperture tube are removed using the "Flush Aperture Tube" function of the dedicated software.

(2) About 30 ml of the electrolytic aqueous solution is placed in a 100 ml flat-bottomed glass beaker, and about 0.3 ml of a diluent obtained by 3-fold by mass dilution of "CONTAMINON N" (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) as a dispersing agent with ion-exchanged water is added thereto.

(3) A predetermined amount of ion-exchanged water is placed in a water tank of an ultrasonic disperser "Ultrasonic Dispersion System Tetora 150" (manufactured by Nikkaki Bios Co., Ltd.) having an electrical output of 120 W and containing two oscillators with an oscillation frequency of 50 kHz that are built in with a phase shift of 180 degrees, and about 2 ml of the CONTAMINON N is added to the water tank.

(4) The beaker of (2) is set in the beaker fixing hole of the ultrasonic disperser and the ultrasonic disperser is operated. The height position of the beaker is adjusted so that the resonance state of the liquid level of the electrolytic aqueous solution in the beaker is maximized.

(5) While the electrolytic aqueous solution in the beaker in (4) above is being irradiated with ultrasonic waves, about 10 mg of toner is added little by little to the electrolytic aqueous solution and dispersed. Then, the ultrasonic dispersion treatment is continued for another 60 sec. In the ultrasonic dispersion, the temperature of water in the water tank is appropriately adjusted to from 10° C. to 40° C.

(6) The electrolytic aqueous solution of (5) in which the toner is dispersed is dropped using a pipette into the round-bottomed beaker of (1) installed in the sample stand, and the measured concentration is adjusted to about 5%. The measurement is continued until the number of measured particles reaches 50,000.

(7) The measurement data are analyzed with the dedicated software provided with the device, and the weight-average particle diameter (D4) is calculated. The weight-average particle diameter (D4) is the "average diameter" on the analysis/volume statistics (arithmetic mean) screen when graph/vol % is set using the dedicated software.

EXAMPLES

The basic constitution and features of the present disclosure are described in the preceding, while the present disclosure is specifically described in the following based on examples. However, the present disclosure is in no way limited thereby. Unless specifically indicated otherwise, parts and % are on a mass basis.

Binder Resin 1 Production Example

Bisphenol A/ethylene oxide (2.2 mol adduct): 50.0 mol parts
Bisphenol A/propylene oxide (2.2 mol adduct): 50.0 mol parts
Terephthalic acid: 90.0 mol parts
Trimellitic anhydride: 10.0 mol parts 100 parts by mass of the above-indicated monomer constituting polyester units was mixed in a 5-liter autoclave together with 500 ppm titanium tetrabutoxide.

A reflux condenser, water separation device, $N_2$ gas introduction line, thermometer, and stirring device were then installed on the autoclave and a condensation polymerization reaction was run at 230° C. while introducing $N_2$ gas into the autoclave. The reaction time was adjusted to provide the desired softening point, and, after the completion of the reaction, removal from the container, cooling, and pulverization yielded the binder resin 1. Binder resin 1 had a softening point of 130° C. and a Tg of 57° C.

The softening point was measured as follows.

Measurement of the Softening Point

The softening point is measured using a "Flowtester CFT-500D Flow Property Evaluation Instrument" (Shimadzu Corporation), which is a constant-load extrusion-type capillary rheometer, in accordance with the manual provided with the instrument. With this instrument, while a constant load is applied by a piston from the top of the measurement sample, the measurement sample filled in a cylinder is heated and melted and the melted measurement sample is extruded from a die at the bottom of the cylinder; a flow curve showing the relationship between piston stroke and temperature can be obtained from this.

The "melting temperature by the ½ method", as described in the manual provided with the "Flowtester CFT-500D Flow Property Evaluation Instrument", is used as the softening point.

The melting temperature by the ½ method is determined as follows.

First, ½ of the difference between the piston stroke Smax at the completion of outflow and the piston stroke Smin at the start of outflow is determined (this value is designated as X, where X=(Smax−Smin)/2). The temperature in the flow curve when the piston stroke in the flow curve reaches the sum of X and Smin is the melting temperature by the ½ method.

The measurement sample used is prepared by subjecting approximately 1.3 g of the sample to compression molding for 60 seconds at 10 MPa in a 25° C. environment using a tablet compression molder (for example, NT-100H, NPa System Co., Ltd.) to provide a cylindrical shape with a diameter of approximately 8 mm. The measurement conditions with the CFT-500D are as follows.

Test mode: ramp-up method
Start temperature: 50° C.
Saturated temperature: 200° C.
Measurement interval: 1.0° C.
Ramp rate: 4.0° C./min
Piston cross section area: 1.000 $cm^2$
Test load (piston load): 10.0 kgf/$cm^2$ (0.9807 MPa)
Preheating time: 300 seconds
Diameter of die orifice: 1.0 mm
Die length: 1.0 mm

Silica Fine Particle A1 Production Example 500 g of a fumed silica with a BET specific surface area of 145 $m^2$/g (the silica fine particle substrate) was introduced into a reactor and was heated under a nitrogen purge while stirring; the temperature in the reactor was controlled to 330° C. Surface treatment of the silica fine particle substrate was then performed by supplying octamethylcyclotetrasiloxane in vapor form as the surface treatment agent into the reactor at 10 g/minute for 60 minutes, followed by heating and stirring for 180 minutes.

The unreacted surface treatment agent was then removed, and the following surface treatment was subsequently performed to yield silica fine particle A1: supply, while stirring under a nitrogen purge, by spraying of a solution of 50 g of polydimethylsiloxane (kinematic viscosity at a temperature of 25° C.: 100 $mm^2$/s) diluted with 500 g of hexane, then stirring and heating for 120 minutes. Table 1 provides the first-stage treatment conditions, while Table 2 provides the second-stage treatment conditions and the properties of the silica fine particle A1.

Silica Fine Particles A2 to A17 Production Example

Silica fine particles A2 to A17 were obtained by carrying out production proceeding as for the silica fine particle A1, but changing the fumed silica (silica fine particle substrate), surface treatment agent, and treatment conditions as shown in Table 1 and Table 2. The properties of silica fine particles A2 to A17 are given in Table 2.

Silica Fine Particle B1 Production Example 500 g of fumed silica with a number-average particle diameter of 120 nm (the silica fine particle substrate) was introduced into a stainless steel (SUS304) reactor connected to a vacuum pump. The pressure in the reactor was reduced to 0.001 Pa and heating and stirring were carried out with the temperature of the reactor controlled to 330° C.

A degassing treatment was run for 30 minutes under these conditions; then, while introducing a vapor of octamethylcyclotetrasiloxane as the surface treatment agent and supplying same at 6 g/minute, the aperture on the valve between the vacuum pump and the reactor was adjusted to control the pressure in the reactor to 1 Pa. A surface treatment was performed on the silica fine particle substrate under these conditions by stirring and heating for 20 minutes. The amount of octamethylcyclotetrasiloxane introduced in this step was a total of 120 g.

Then, the interior of the reactor was pumped down to 0.001 Pa in order to remove reaction products and unreacted surface treatment agent. After a degassing treatment under these conditions for 30 minutes, the octamethylcyclotetrasiloxane vapor surface treatment agent was again introduced at a supply rate of 6 g/minute while controlling the pressure in the reactor to 1 Pa. A second surface treatment was performed on the silica fine particles by heating and stirring under these conditions for 20 minutes. The amount of octamethylcyclotetrasiloxane introduced in this step was a total of 120 g.

After carrying out a degassing treatment under the above-mentioned conditions for 30 minutes, the octamethylcyclotetrasiloxane vapor surface treatment agent was again introduced at a supply rate of 6 g/minute while controlling the pressure in the reactor to 1 Pa. A third surface treatment was performed on the silica fine particles by heating and stirring under these conditions for 20 minutes. The amount of octamethylcyclotetrasiloxane introduced in this step was a total of 120 g. Then, while continuing the same heating and stirring, the interior of the reactor was pumped down to 0.001 Pa in order to remove unreacted surface treatment agent, thereby yielding the silica fine particle Bl.

TABLE 1

| Silica fine particle No. | First-stage treatment conditions<br>Surface treatment agent | BET specific surface area of silica fine particle starting material ($m^2/g$) | Amount of treatment agent (g) | Amount of treatment agent (parts) | Treatment temperature (° C.) | Treatment time (min) | Amount of carbon after first-stage treatment (mass %) |
|---|---|---|---|---|---|---|---|
| A1 | Octamethylcyclotetrasiloxane | 145 | 600 | 120 | 330° C. | 180 | 1.6 |
| A2 | Octamethylcyclotetrasiloxane | 200 | 600 | 120 | 330° C. | 180 | 2.2 |
| A3 | Octamethylcyclotetrasiloxane | 300 | 600 | 120 | 330° C. | 180 | 3.1 |
| A4 | Octamethylcyclotetrasiloxane | 145 | 480 | 96 | 330° C. | 120 | 1.6 |
| A5 | Octamethylcyclotetrasiloxane | 145 | 360 | 72 | 330° C. | 60 | 1.6 |
| A6 | Octamethylcyclotetrasiloxane | 145 | 360 | 72 | 300° C. | 60 | 1.5 |
| A7 | Octamethylcyclotetrasiloxane | 90 | 360 | 72 | 300° C. | 60 | 1.4 |
| A8 | Octamethylcyclotetrasiloxane | 90 | 360 | 72 | 300° C. | 60 | 1.4 |
| A9 | Octamethylcyclotetrasiloxane | 90 | 360 | 72 | 300° C. | 60 | 1.4 |
| A10 | Octamethylcyclotetrasiloxane | 90 | 360 | 72 | 300° C. | 60 | 1.4 |
| A11 | Octamethylcyclotetrasiloxane | 90 | 240 | 48 | 300° C. | 30 | 1.5 |
| A12 | Hexamethylcyclotrisiloxane | 90 | 240 | 48 | 300° C. | 30 | 1.5 |
| A13 | Decamethylcyclopentasiloxane | 90 | 240 | 48 | 300° C. | 30 | 1.5 |
| A14 | Hexamethyldisilazane | 145 | 480 | 96 | 170° C. | 60 | 2.0 |
| A15 | Octamethylcyclotetrasiloxane | 145 | 480 | 96 | 280° C. | 30 | 1.4 |
| A16 | — | — | — | — | — | — | — |
| A17 | — | — | — | — | — | — | — |

The amount (parts) of treatment agent in Tables 1 and 2-1 indicates the number of parts by mass of the surface treatment agent relative to 100 parts by mass of the silica fine particle substrate.

TABLE 2-1

| Silica fine particle No. | Second-stage treatment conditions<br>Surface treatment agent | Kinematic viscosity at a temperature of 25° C. ($mm^2/s$) | Amount of treatment agent (parts) | Treatment temperature (° C.) | Treatment time (min) |
|---|---|---|---|---|---|
| A1 | Polydimethylsiloxane | 100 | 10 | 330° C. | 120 |
| A2 | Polydimethylsiloxane | 100 | 10 | 330° C. | 60 |
| A3 | Polydimethylsiloxane | 100 | 10 | 330° C. | 60 |
| A4 | Polydimethylsiloxane | 50 | 12 | 300° C. | 60 |
| A5 | Polydimethylsiloxane | 50 | 20 | 300° C. | 60 |
| A6 | Polydimethylsiloxane | 200 | 5 | 300° C. | 60 |
| A7 | Polydimethylsiloxane | 200 | 5 | 300° C. | 60 |
| A8 | Polydimethylsiloxane | 300 | 5 | 300° C. | 60 |
| A9 | Polydimethylsiloxane | 300 | 5 | 300° C. | 30 |
| A10 | Polydimethylsiloxane | 300 | 3 | 300° C. | 30 |
| A11 | Polydimethylsiloxane | 300 | 3 | 280° C. | 30 |
| A12 | Polydimethylsiloxane | 300 | 3 | 280° C. | 30 |
| A13 | Polydimethylsiloxane | 500 | 25 | 250° C. | 30 |
| A14 | Polydimethylsiloxane | 100 | 10 | 170° C. | 60 |
| A15 | Polydimethylsiloxane | 100 | 10 | 280° C. | 60 |
| A16 | Polydimethylsiloxane | 300 | 25 | 330° C. | 30 |
| A17 | Polydimethylsiloxane | 300 | 25 | 250° C. | 30 |

TABLE 2-2

| Silica fine particle No. | Properties: BET specific surface area of silica fine particle ($m^2/g$) | Amount of moisture adsorption for silica fine particle ($cm^3/m^2$) | SD2/SD1 | SD2w/SD1w | Amount of carbon after second-stage treatment (mass %) | Carbon loss ratio (%) | Amount of released component (parts by mass) | Particle diameter (nm) |
|---|---|---|---|---|---|---|---|---|
| A1 | 85 | 0.03 | 0.18 | 0.22 | 4.4 | 48 | 6.8 | 15 |
| A2 | 110 | 0.02 | 0.23 | 0.25 | 4.6 | 39 | 7.2 | 12 |
| A3 | 155 | 0.02 | 0.21 | 0.24 | 5.8 | 36 | 7.1 | 7 |
| A4 | 80 | 0.04 | 0.20 | 0.23 | 4.9 | 55 | 9.0 | 15 |
| A5 | 74 | 0.04 | 0.15 | 0.17 | 7.0 | 30 | 3.4 | 15 |
| A6 | 96 | 0.03 | 0.27 | 0.30 | 3.1 | 65 | 17.0 | 15 |
| A7 | 65 | 0.06 | 0.15 | 0.17 | 3.1 | 25 | 2.8 | 22 |
| A8 | 65 | 0.06 | 0.15 | 0.17 | 3.1 | 25 | 2.8 | 22 |
| A9 | 65 | 0.06 | 0.15 | 0.16 | 3.1 | 25 | 2.8 | 22 |
| A10 | 65 | 0.06 | 0.12 | 0.14 | 1.8 | 10 | 1.0 | 22 |
| A11 | 65 | 0.08 | 0.12 | 0.13 | 1.8 | 10 | 1.0 | 22 |
| A12 | 65 | 0.08 | 0.12 | 0.14 | 1.8 | 10 | 1.0 | 22 |
| A13 | 40 | 0.13 | 0.30 | 0.32 | 8.4 | 70 | 20.0 | 22 |
| A14 | 85 | 0.03 | — | — | 4.5 | 64 | 10.0 | 15 |
| A15 | 85 | 0.03 | 0.32 | 0.35 | 4.3 | 75 | 8.0 | 15 |
| A16 | 68 | 0.07 | 0.40 | 0.40 | 7.1 | 40 | 20.0 | 22 |
| A17 | 40 | 0.14 | 0.45 | 0.45 | 7.2 | 3 | 3.0 | 22 |

In Table 2-2, SD1 indicates the peak corresponding to the silicon atom having the D1 unit structure, SD2 indicates the peak corresponding to the silicon atom having the D2 unit structure, and the particle diameter indicates the number-average particle diameter (nm).

Example 1

| | |
|---|---|
| Binder resin 1 | 100 parts |
| Paraffin wax (melting point: 78° C.) | 4 parts |
| Carbon black (Nipex 35) | 6 parts |

The materials listed above were preliminarily mixed using a Henschel mixer (product name: Model FM-10C, Nippon Coke & Engineering Co., Ltd.), followed by melt-kneading at 160° C. using a twin-screw kneader extruder.

The resulting kneaded material was cooled and coarsely pulverized using a hammer mill and was subsequently finely pulverized using a Turbo mill.

The obtained finely pulverized material was classified using a Coanda effect-based multi-grade classifier to obtain a toner particle 1 having a weight-average particle diameter (D4) of 6.5 μm.

An external addition treatment with silica fine particles A1 and Bi was performed as described below on the resulting toner particle 1.

Toner particle 1: 100 parts

Silica fine particle A1: 1.0 parts

Silica fine particle B1: 1.0 parts

These materials were mixed using a Henschel mixer (product name: Model FM-10C, Nippon Coke & Engineering Co., Ltd.) at a rotation rate of 67 $s^{-1}$ (4,000 rpm) for a rotation time of 2 min and at an external addition temperature of room temperature; this was followed by passage across an ultrasound vibrating screen with an aperture of 54 μm to provide the toner 1.

Magnetic Carrier Core Particle 1 Production Example

Step 1 (Weighing and Mixing Step)

| | |
|---|---|
| $Fe_2O_3$ | 68.3 mass % |
| $MnCO_3$ | 28.5 mass % |
| $Mg(OH)_2$ | 2.0 mass % |
| $SrCO_3$ | 1.2 mass % |

These ferrite starting materials were weighed out; 20 parts water was added to 80 parts of the ferrite starting materials; and a slurry was then prepared by wet mixing for 3 hours using a ball mill and zirconia with a diameter (o) of 10 mm. The solids fraction concentration in the slurry was 80 mass %.

Step 2 (Prefiring Step)

The mixed slurry was dried using a spray dryer (Ohkawara Kakohki Co., Ltd.), followed by firing in a batch electric furnace for 3.0 hours at a temperature of 1050° C. in a nitrogen atmosphere (1.0 volume % oxygen concentration) to produce a prefired ferrite.

Step 3 (Pulverization Step)

The prefired ferrite was pulverized to approximately 0.5 mm using a crusher, and water was then added to prepare a slurry. The solids fraction concentration of this slurry was brought to 70 mass %. Milling was carried out for 3 hours using a wet ball mill and 1/8-inch stainless steel beads to obtain a slurry. This slurry was additionally milled for 4 hours using a wet bead mill and zirconia with a diameter of 1 mm to obtain a prefired ferrite slurry having a 50% particle diameter on a volume distribution basis (D50) of 1.3 μm.

Step 4 (Granulation Step)

1.0 parts of ammonium polycarboxylate as a dispersing agent and 1.5 parts of polyvinyl alcohol as a binder were added to 100 parts of the prefired ferrite slurry, followed by granulation into spherical particles and drying using a spray dryer (Ohkawara Kakohki Co., Ltd.). The particle size of the obtained granulate was adjusted followed by heating for 2 hours at 700° C. using a rotary electric furnace to remove the organic component, e.g., the dispersing agent and binder.

Step 5 (Firing Step)

The granulate was fired in a nitrogen atmosphere (1.0 volume % oxygen concentration) using 2 hours for the time from room temperature to the firing temperature (1100° C.) and holding for 4 hours at the temperature of 1100° C. This was followed by dropping the temperature to a temperature of 60° C. over 8 hours, returning the nitrogen atmosphere to the atmosphere, and removing the fired material at a temperature not above 40° C.

Step 6 (Screening Step)

The aggregated particles in the resulting fired material were crushed; the coarse particles were then removed by screening across a screen with an aperture of 150 μm; the fines were removed using air classification; and the weakly magnetic component was removed by magnetic screening to obtain a porous magnetic core particle 1.

Step 7 (Filling Step)

100 parts of the porous magnetic core particle 1 was introduced into the stirring container of a mixer/stirrer (Model NDMV All-Purpose Stirrer, Dalton Corporation), and 5 parts of a fill resin, comprising 95.0 mass % methylsilicone oligomer and 5.0 mass % γ-aminopropyltrimethoxysilane, was added dropwise at normal pressure while holding the temperature at 60° C.

After completion of the dropwise addition, stirring was continued while adjusting the time, and the temperature was raised to 70° C. to fill the resin composition into the individual porous magnetic core particles.

After cooling, the resulting resin-filled magnetic core particles were transferred to a mixer having a spiral impeller in a rotatable mixing container (Model UD-AT drum mixer, Sugiyama Heavy Industrial Co., Ltd.), and the temperature was raised under a nitrogen atmosphere at a ramp rate of 2° C./minute to 140° C. while stirring. This was followed by continuing to heat and stir at 140° C. for 50 minutes.

This was followed by cooling to room temperature, removal of the cured resin-filled ferrite particles, and removal of the nonmagnetic material using a magnetic screener. The coarse particles were removed using a vibrating screen to obtain a resin-filled magnetic carrier core particle 1.

Coating Resin Production Example

| | |
|---|---|
| Cyclohexyl methacrylate monomer | 26.8 mass % |
| Methyl methacrylate monomer | 0.2 mass % |
| Methyl methacrylate macromonomer | 8.4 mass % |

(Macromonomer having the methacryloyl group at one terminal and having a weight-average molecular weight of 5,000; this is given by Formula (B) wherein A is a polymer of methyl methacrylate)

| | |
|---|---|
| Toluene | 31.3 mass % |
| Methyl ethyl ketone | 31.3 mass % |
| Azobisisobutyronitrile | 2.0 mass % |

Of these materials, the cyclohexyl methacrylate monomer, methyl methacrylate monomer, methyl methacrylate macromonomer, toluene, and methyl ethyl ketone were introduced into a four-neck separable flask fitted with a reflux condenser, thermometer, nitrogen introduction line, and stirrer. Nitrogen gas was introduced into the separable flask to thoroughly establish a nitrogen atmosphere, and this was followed by heating to 80° C., the addition of the azobisisobutyronitrile, and polymerization for 5 hours under reflux.

Hexane was poured into the resulting reaction product to precipitate the copolymer.

The resulting precipitate was separated by filtration and vacuum dried to obtain a resin.

30 parts of this resin was dissolved in a mixed solvent of 40 parts of toluene and 30 parts of methyl ethyl ketone to obtain a resin solution (solids concentration=30%).

Coating Resin Solution Production Example

| | |
|---|---|
| Resin solution (30% solids concentration) | 33.3 mass % |
| Toluene | 66.4 mass % |
| Carbon black (Regal 330, Cabot Corporation) | 0.3 mass % |

(Number-average primary particle diameter: 25 nm, specific surface area by nitrogen adsorption: 94 $m^2/g$, DBP absorption: 75 mL/100 g)

The materials listed above were introduced into a paint shaker and were dispersed for 1 hour using zirconia beads having a diameter of 0.5 mm. The obtained dispersion was filtered across a 5.0 μm membrane filter to obtain a coating resin solution.

Magnetic Carrier 1 Production Example

The coating resin solution and the magnetic carrier core particles (the amount of introduction of the coating resin solution was 2.5 parts as the resin component per 100 parts of the magnetic carrier core particle 1) were introduced into a vacuum-degassing kneader being maintained at normal temperature.

After the introduction, stirring was performed for 15 minutes at a stirring rate of 30 rpm and the solvent was evaporated by at least a prescribed amount (80%) followed by raising the temperature to 80° C. while mixing under reduced pressure, distilling off the toluene over 2 hours, and cooling.

The low magnetic force product was separated from the resulting magnetic carrier using a magnetic force screening, and the magnetic carrier was then passed through a sieve having an aperture of 70 μm and was classified using a wind force classifier to obtain a magnetic carrier 1 having a 50% particle diameter (D50) on a volume distribution basis of 38.2 μm.

Two-Component Developer 1 Production Example, and Evaluations

A two-component developer 1 was produced by mixing the toner 1 and the magnetic carrier 1 so as to provide a toner concentration of 8.0 mass %; mixing was performed using a V-mixer (Model V-10, Tokuju Kosakusho Co., Ltd.) at 0.5 $s^{-1}$ for a rotation time of 5 minutes. The following evaluations were carried out using the obtained two-component developer 1.

Evaluations

An imagePRESS C850 (Canon, Inc.) was used as the image-forming machine; the fixing unit was removed to the exterior, the fixation temperature was made freely controllable, and the image-forming speed was modified so as to output 105 prints/minute in A4 size. In addition, the development contrast was made adjustable by any value and autocorrection by the main unit was disengaged. The frequency of the alternating electric field was fixed at 2.0 kHz, and the peak-to-peak voltage (Vpp) was configured so the Vpp could be varied in 0.1 kV steps from 0.7 kV to 1.8 kV.

The two-component developer 1 was introduced into the developing device at the black position of this image-forming machine, the charging voltage VD of the electrostatic latent image bearing member and the laser power were adjusted, and the following evaluations were performed. The evaluation was performed at two levels in each of the evaluations: an image-forming speed of 105 prints/min at A4 size and an image-forming speed of 85 prints/min at A4 size.

White paper (product name: CS-814 (A4, 81.4 g/$m^2$), Canon Marketing Japan Inc.) was used as the evaluation paper.

In the following evaluations, an FFH image is a value that presents 256 gradations in hexadecimal format, with 00H being the 1st gradation (white background region) of the 256 gradations and FFH being the 256th gradation (solid region) of the 256 gradations.

Evaluation of the Environmental Dependence

Operating in a normal-temperature, normal-humidity environment (temperature 23° C./humidity 50 RH %, also referred to hereafter as the "N/N environment") and adjusting the development contrast at the transfer unit, the reflection density of an image output as an FFH image was measured using an optical densitometer and setting was made to provide a reflection density of 1.50. Five image prints were output using the aforementioned image formation conditions, the output image densities were measured, and the arithmetic average of the densities was determined to give the image density A.

Then, while operating in a high-temperature, high-humidity environment (temperature 30° C./humidity 80% RH, also referred to hereafter as the "H/H environment"), the transfer unit was held, with the development contrast set in the N/N environment remaining unchanged, for 24 hours in the H/H environment. This was followed by the output of 5 image prints, measurement of the output image densities, and determination of the arithmetic average of the densities to give the image density B.

An X-Rite color reflection densitometer (X-Rite, Incorporated) was used as the optical densitometer.

The density variation given by the following formula was calculated and the image density stability was evaluated using this density variation. A density variation of less than 0.18 was assessed as good.

$$\text{density variation} = |\text{image density } A - \text{image density } B|$$

A: less than 0.06
B: 0.06 or more and less than 0.10
C: 0.10 or more and less than 0.14
D: 0.14 or more and less than 0.18
E: 0.18 or more Evaluation of the Temporal Stability Operating in an N/L (normal temperature and low humidity) environment (temperature 23° C./humidity 5% RH) and fixing the initial Vpp at 1.3 kV, the contrast potential was set so as to provide a reflection density for a monochrome black FFH image of 1.50. At this setting, 2,000 prints were continuously output of an image pattern for which the ratio of a monochrome black image to the paper surface was 1%. Then, an image output as a monochrome black FFH image was again output at a Vpp of 1.3 kV and the image density was measured; the contrast potential was determined at which the reflection density of the image output as a monochrome black FFH image was 1.50; and the difference between initial and post-output was compared. The reflection density was measured using a Series 500 spectral densitometer (X-Rite, Incorporated).

Criteria for Evaluation of the Developing Performance

A: the difference between initial and post-output is less than 40 V
B: the difference between initial and post-output is 40 V or more and less than 60 V
C: the difference between initial and post-output is 60 V or more and less than 80 V
D: the difference between initial and post-output is 80 V or more and less than 100 V
E: the difference between initial and post-output is 100 V or more Evaluation of Hollow Defects During Transfer Operating in an H/H environment and adjusting the development contrast at the transfer unit, the reflection density of an image output as an FFH image was measured using an optical densitometer and setting was made to provide a reflection density of 1.50. At this setting, 50,000 prints were continuously output of an image pattern for which the ratio of a monochrome black image to the paper surface was 1%. After this, one print was output of a 500 μm horizontal line pattern, and the fine lines were enlarged with a digital microscope to acquire an image. This was followed by binarization processing and by calculation of the amount of occurrence of hollow defects in the line width as the hollow defect ratio on an area ratio basis. For example, a hollow defect ratio of 50% indicates that a background white region of 50% is seen in a line width. The evaluation of the hollow defects during transfer was scored from the resulting hollow defect ratio using the following criteria.

A: the hollow defect ratio is less than 1.0%
B: the hollow defect ratio is 1.0% or more and less than 5.0%
C: the hollow defect ratio is 5.0% or more and less than 10.0%
D: the hollow defect ratio is 10.0% or more and less than 20.0%
E: the hollow defect ratio is 20.0% or more Evaluation of Image Uniformity Operating in an N/L (normal temperature and low humidity) environment (temperature 23° C./humidity 5% RH) and adjusting the development contrast at the transfer unit, the reflection density of an image output as an FFH image was measured using an optical densitometer and setting was made to provide a reflection density of 1.50. At this setting, 100,000 prints were continuously output of an image pattern for which the ratio of a monochrome black image to the paper surface was 40%. This was followed by the output of three prints of a full-surface 96H halftone image on A3 paper, and the image on the third print was used for the evaluation. For the evaluation of image uniformity, the image density at five locations was measured and the difference between the maximum image density value and the minimum image density value (the density difference) was determined. The image density was measured using a 500 Series spectral densitometer (X-Rite, Incorporated), and the assessment was made using the following criteria.

A: the density difference is less than 0.03
B: the density difference is 0.03 or more and less than 0.06
C: the density difference is 0.06 or more and less than 0.09
D: the density difference is 0.09 or more and less than 0.12
E: the density difference is 0.12 or more Charging Wire Contamination After the preceding evaluation of image uniformity, visual observation was carried out on charging wire contamination in the charging device at the black position of the image-forming device used for the evaluation, and evaluation was performed using the following criteria.

A: contamination is not seen
B: slight contamination is seen
C: moderate contamination is seen
D: contamination is seen
E: substantial contamination is seen The results of these evaluations are given in Tables 5-1 and 5-2. For each of the items evaluated in the preceding, items not receiving a score of E were assessed as good.

Toners 2 to 20 Production Example

Toners 2 to 20 were obtained proceeding as in the Toner 1 Production Example, but changing the type of silica fine particle A and silica fine particle B as shown in Table 3.

TABLE 3

| Toner | Toner particle | Silica fine particle A | Silica fine particle B | D4 (μm) |
|---|---|---|---|---|
| 1 | 1 | A1 | B1 | 6.5 |
| 2 | 1 | A2 | B1 | 6.5 |
| 3 | 1 | A3 | B1 | 6.5 |
| 4 | 1 | A1 | — | 6.5 |
| 5 | 1 | A2 | — | 6.5 |
| 6 | 1 | A3 | — | 6.5 |
| 7 | 1 | A4 | — | 6.5 |
| 8 | 1 | A5 | — | 6.5 |
| 9 | 1 | A6 | — | 6.5 |
| 10 | 1 | A7 | — | 6.5 |
| 11 | 1 | A8 | — | 6.5 |
| 12 | 1 | A9 | — | 6.5 |
| 13 | 1 | A10 | — | 6.5 |
| 14 | 1 | A11 | — | 6.5 |
| 15 | 1 | A12 | — | 6.5 |
| 16 | 1 | A13 | — | 6.5 |
| 17 | 1 | A14 | — | 6.5 |
| 18 | 1 | A15 | — | 6.5 |
| 19 | 1 | A16 | — | 6.5 |
| 20 | 1 | A17 | — | 6.5 |

The D4 (μm) in the table indicates the weight-average particle diameter (μm) of the toner.

Magnetic Carrier 2 Production Example

A magnetic carrier 2 was obtained proceeding as in the Magnetic Carrier 1 Production Example, but changing the material of the coating resin as follows.

| | |
|---|---|
| Cyclohexyl methacrylate monomer | 26.8 mass % |
| Methyl methacrylate monomer | 8.6 mass % |
| Toluene | 31.3 mass % |
| Methyl ethyl ketone | 31.3 mass % |
| Azobisisobutyronitrile | 2.0 mass % |

Magnetic Carrier 3 Production Example

A magnetic carrier 3 was obtained proceeding as in the Magnetic Carrier 1 Production Example, but changing the material of the coating resin as follows.

| | |
|---|---|
| Methyl methacrylate monomer | 35.4 mass % |
| Toluene | 31.3 mass % |
| Methyl ethyl ketone | 31.3 mass % |
| Azobisisobutyronitrile | 2.0 mass % |

Two-Component Developers 2 to 22 Production Example

Two-component developers 2 to 22 were obtained proceeding as in the production example for developer 1, but changing the magnetic carrier and toner as shown in Table 4.

TABLE 4

| Two-component developer | Toner | Magnetic carrier |
|---|---|---|
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |
| 10 | 10 | 1 |
| 11 | 11 | 1 |
| 12 | 12 | 1 |
| 13 | 13 | 1 |
| 14 | 13 | 2 |
| 15 | 13 | 3 |
| 16 | 14 | 3 |
| 17 | 15 | 3 |
| 18 | 16 | 3 |
| 19 | 17 | 3 |
| 20 | 18 | 3 |
| 21 | 19 | 3 |
| 22 | 20 | 3 |

Evaluations

Evaluations were performed as in Example 1, but using two-component developers 2 to 22. The results of the evaluations are given in Tables 5-1 and 5-2.

TABLE 5-1

| Evaluation | | Evaluation of environmental dependence | | | | Evaluation of temporal stability | | | |
|---|---|---|---|---|---|---|---|---|---|
| Example/ comparative example | Two-component developer | Speed 85 prints/min | | Speed 105 prints/min | | Image-forming speed 85 prints/min | | Image-forming speed 105 prints/min | |
| Example 1 | 1 | 0.00 | A | 0.01 | A | 21 | A | 25 | A |
| Example 2 | 2 | 0.00 | A | 0.01 | A | 21 | A | 25 | A |
| Example 3 | 3 | 0.00 | A | 0.01 | A | 21 | A | 25 | A |

TABLE 5-1-continued

| Evaluation Example/ comparative example | Two-component developer | Evaluation of environmental dependence Speed 85 prints/min | | Speed 105 prints/min | | Evaluation of temporal stability Image-forming speed 85 prints/min | | Image-forming speed 105 prints/min | |
|---|---|---|---|---|---|---|---|---|---|
| Example 4 | 4 | 0.01 | A | 0.02 | A | 26 | A | 31 | A |
| Example 5 | 5 | 0.01 | A | 0.02 | A | 26 | A | 31 | A |
| Example 6 | 6 | 0.01 | A | 0.02 | A | 26 | A | 31 | A |
| Example 7 | 7 | 0.02 | A | 0.03 | A | 30 | A | 35 | A |
| Example 8 | 8 | 0.02 | A | 0.03 | A | 30 | A | 35 | A |
| Example 9 | 9 | 0.03 | A | 0.05 | A | 32 | A | 42 | B |
| Example 10 | 10 | 0.04 | A | 0.06 | B | 33 | A | 49 | B |
| Example 11 | 11 | 0.04 | A | 0.07 | B | 35 | A | 54 | B |
| Example 12 | 12 | 0.05 | A | 0.08 | B | 37 | A | 60 | C |
| Example 13 | 13 | 0.05 | A | 0.09 | B | 38 | A | 63 | C |
| Example 14 | 14 | 0.05 | A | 0.09 | B | 38 | A | 67 | C |
| Example 15 | 15 | 0.05 | A | 0.12 | C | 38 | A | 72 | C |
| Example 16 | 16 | 0.05 | A | 0.14 | D | 38 | A | 76 | C |
| Example 17 | 17 | 0.05 | A | 0.15 | D | 38 | A | 80 | D |
| Example 18 | 18 | 0.05 | A | 0.16 | D | 38 | A | 84 | D |
| Comparative example 1 | 19 | 0.05 | A | 0.17 | D | 38 | A | 89 | D |
| Comparative example 2 | 20 | 0.13 | C | 0.18 | E | 82 | D | 96 | D |
| Comparative example 3 | 21 | 0.14 | D | 0.19 | E | 88 | D | 102 | E |
| Comparative example 4 | 22 | 0.16 | D | 0.21 | E | 93 | D | 105 | E |

TABLE 5-2

| Evaluation Example/ comparative example | Two-component developer | Evaluation of hollow defects during transfer Speed 85 prints/min | | Speed 105 prints/min | | Evaluation of image uniformity Speed 85 prints/min | | Speed 105 prints/min | | Charging wire contamination Speed 85 prints/min | Speed 105 prints/min |
|---|---|---|---|---|---|---|---|---|---|---|---|
| Example 1 | 1 | 0.2 | A | 0.5 | A | 0.01 | A | 0.01 | A | A | A |
| Example 2 | 2 | 0.2 | A | 0.5 | A | 0.01 | A | 0.01 | A | A | A |
| Example 3 | 3 | 0.2 | A | 0.5 | A | 0.01 | A | 0.01 | A | A | A |
| Example 4 | 4 | 0.5 | A | 1.5 | B | 0.01 | A | 0.02 | A | A | A |
| Example 5 | 5 | 0.5 | A | 1.5 | B | 0.01 | A | 0.02 | A | A | A |
| Example 6 | 6 | 0.5 | A | 1.5 | B | 0.01 | A | 0.02 | A | A | A |
| Example 7 | 7 | 0.7 | A | 2.5 | B | 0.02 | A | 0.03 | B | A | B |
| Example 8 | 8 | 0.7 | A | 2.7 | B | 0.02 | A | 0.04 | B | A | B |
| Example 9 | 9 | 0.9 | A | 3.0 | B | 0.02 | A | 0.06 | C | A | C |
| Example 10 | 10 | 0.9 | A | 3.9 | B | 0.02 | A | 0.06 | C | A | C |
| Example 11 | 11 | 0.9 | A | 6.3 | C | 0.02 | A | 0.07 | C | A | C |
| Example 12 | 12 | 0.9 | A | 7.4 | C | 0.02 | A | 0.07 | C | A | C |
| Example 13 | 13 | 0.9 | A | 10.4 | D | 0.02 | A | 0.08 | C | A | C |
| Example 14 | 14 | 0.9 | A | 11.2 | D | 0.02 | A | 0.09 | D | A | D |
| Example 15 | 15 | 0.9 | A | 11.4 | D | 0.02 | A | 0.09 | D | A | D |
| Example 16 | 16 | 0.9 | A | 12.6 | D | 0.02 | A | 0.10 | D | A | D |
| Example 17 | 17 | 0.9 | A | 13.7 | D | 0.02 | A | 0.10 | D | A | D |
| Example 18 | 18 | 0.9 | A | 15.0 | D | 0.02 | A | 0.11 | D | A | D |
| Comparative example 1 | 19 | 0.9 | A | 16.8 | D | 0.02 | A | 0.12 | E | A | E |
| Comparative example 2 | 20 | 12.0 | D | 18.4 | D | 0.09 | D | 0.13 | E | D | E |
| Comparative example 3 | 21 | 13.0 | D | 19.5 | D | 0.10 | D | 0.14 | E | D | E |
| Comparative example 4 | 22 | 15.0 | D | 21.0 | E | 0.11 | D | 0.14 | E | D | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-074957, filed Apr. 28, 2022 which is hereby incorporated by reference herein in its entirety.

What is claimed is:

1. A toner, comprising:

a toner particle; and a silica fine particle A on a surface of the toner particle, silica fine particle A comprises a silicone oil;

a weight-average particle diameter of the toner being 4.0 to 15.0 μm, wherein a carbon loss ratio when silica fine particle A is washed with hexane is 5 to 70%, SD2/SD1 is 0.05 to 0.30 and SD2w/SD1w is 0.05 or more when upon measuring in a solid-state CP/MAS $^{29}$Si-NMR measurement of the silica fine particle A, peak PD1 corresponds to a silicon atom indicated by $Si^a$ in Formula (1), peak PD2 corresponds to a silicon atom indicated by $Si^b$ in Formula (2), SD1 is an area of peak PD1, and SD2 is an area of peak PD2

(1)

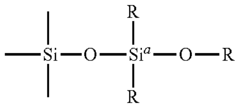

(2)

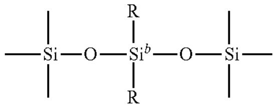

where each R independently represents a hydrogen atom, methyl group or ethyl group, and upon measuring in a solid-state CP/MAS $^{29}$Si-NMR measurement of the silica fine particle A after washing thereof with hexane, peak PD1w corresponds to a silicon atom indicated by $Si^a$ in Formula (1), peak PD2w corresponds to a silicon atom indicated by $Si^b$ in Formula (2), SD1w is an area of peak PD1w and SD2w be an area of peak PD2w.

2. The toner according to claim 1, wherein the carbon loss ratio when the silica fine particle A is washed with hexane is 30 to 55%.

3. The toner according to claim 1, wherein silicone oil is released when the silica fine particle A is washed with hexane comprises silicone oil.

4. The toner according to claim 1, wherein an amount of a released component on a carbon basis for the silica fine particle A is 3.0 to 9.0 parts by mass relative to 100 parts by mass of the silica fine particle A.

5. The toner according to claim 1, wherein silica fine particle A has a BET specific surface area of 70 to 160 $m^2/g$.

6. The toner according to claim 1, wherein silica fine particle A has a moisture adsorption of 0.01 to 0.07 $cm^3/m^2$ per 1 $m^2$ of a BET specific surface area at a temperature of 30° C. and a relative humidity of 80%.

7. The toner according to claim 1, which further comprises silica fine particle B that is different from silica fine particle A.

8. The toner according to claim 1, wherein a content of silica fine particle A is 0.20 to 3.00 parts by mass relative to 100 parts by mass of the toner particle.

9. The toner according to claim 1, wherein silica fine particle A is a treated material provided by treating silica fine particle with a cyclic siloxane, and further treating a resultant with a silicone oil.

10. A two-component developer, comprising:

a toner according to claim 1 and a magnetic carrier;

the magnetic carrier comprising a magnetic carrier core particle having a resin-coating layer on a surface of the magnetic carrier core particle;

the resin in the resin-coating layer contains a monomer unit provided by a (meth)acrylate ester having an alicyclic hydrocarbon group.

11. The two-component developer according to claim 10, wherein the resin in the resin-coating layer comprises a monomer unit provided by a macromonomer according to Formula (B);

(B)

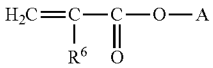

where $R^6$ is H or $CH_3$, and A represents a polymer of at least one compound selected from the group consisting of methyl acrylate, methyl methacrylate, butyl acrylate, butyl methacrylate, 2-ethylhexyl acrylate, 2-ethylhexyl methacrylate, styrene, acrylonitrile and methacrylonitrile.

12. A toner production method providing the toner according to claim 1, comprising the steps of:

obtaining a surface-treated material by mixing cyclic siloxane with a silica fine particle substrate and carrying out a heat treatment at a temperature of 300° C. or more;

obtaining a silica fine particle A by further treating the surface-treated material with silicone oil; and obtaining the toner by mixing a toner particle with the silica fine particle A.

13. The toner production method according to claim 12, wherein the temperature when the surface-treated material is further treated with silicone oil is 300° C. or more.

* * * * *